United States Patent [19]

Tapang

[11] Patent Number: 4,926,064
[45] Date of Patent: May 15, 1990

[54] SLEEP REFRESHED MEMORY FOR NEURAL NETWORK

[75] Inventor: Carlos C. Tapang, Portland, Oreg.

[73] Assignee: Syntonic Systems Inc., Portland, Oreg.

[21] Appl. No.: 387,373

[22] Filed: Jul. 26, 1989

Related U.S. Application Data

[63] Continuation of Ser. No. 222,887, Jul. 22, 1988, abandoned.

[51] Int. Cl.$^5$ .............................................. G06G 7/184
[52] U.S. Cl. ..................................... 307/201; 364/513; 364/807
[58] Field of Search .................. 307/201; 364/513, 807

[56] References Cited

U.S. PATENT DOCUMENTS

| | | | |
|---|---|---|---|
| 3,273,125 | 9/1966 | Jakowitz | 307/201 |
| 3,496,382 | 2/1970 | Hendrix | 307/201 |
| 3,950,733 | 4/1976 | Cooper et al. | 307/201 X |
| 4,660,166 | 4/1987 | Hopfield | 364/807 |
| 4,731,747 | 3/1988 | Denker | 364/807 |
| 4,807,168 | 2/1989 | Moopenn et al. | 307/201 X |

OTHER PUBLICATIONS

Hoffmann and Benson, "Neurons With Hysteresis Form a Network That Can Learn Without Any Changes in Synaptic Connection Strengths", Conf.-Neural Networks for Computing, Snowbird, UT, U.S.A. 13-16 Apr. 1986.

Kosugi et al, "Considerations on Pattern Separation in Randomly Connected Layered Neuronal Networks", Systems Computers Controls, vol. 6, No. 5, 19785, pp. 68-76 (307/201).

"The Art of Adaptive Pattern Recognition by a Self-Organized Neural Network,": Gail A. Carpenter and Stephen Grossberg, IEEE, Mar. 1988, pp. 77-88.

"Neocognitron: A Hierarchical Neural Network Capable of Visual Pattern Recognition," Kunihiko Fukushima, Neural Networks, vol. 1, 1988, pp. 119-130.

(List continued on next page.)

*Primary Examiner*—David Hudspeth
*Attorney, Agent, or Firm*—Fliesler, Dubb, Meyer & Lovejoy

[57] ABSTRACT

A method and apparatus are disclosed for implementing a neural network having a sleep mode during which capacitively stored synaptic connectivity weights are refreshed. Each neuron outputs an analog activity level, represented in a preferred embodiment by the frequency of digital pulses. Feed-forward synaptic connection circuits couple the activity level outputs of first level neurons to inputs of second level neurons, and feed-back synaptic connection circuits couple outputs of second level neurons to inputs of first level neurons, the coupling being weighted according to connectivity weights stored on respective storage capacitors in each synaptic connection circuit. The network learns according to a learning algorithm under which the connections in both directions between a particular first level neuron and a particular second level neuron are strengthened to the extent of concurrence of high activity levels in both the first and second level neurons, and weakened to the extent of concurrence of a high activity level in the second level neuron and a low activity level in the first level neuron. The network is put to sleep by disconnecting all environmental inputs and providing a non-specific low activity level signal to each of the first level neurons. This causes the network to randomly traverse its state space with low intensity resonant firings, each state being visited with a probability responsive to the initial connectivity weights of the connections which abut the second level neuron representing such state. Refresh is accomplished since the learning algorithm remains active during sleep. Thus, the sleep refresh mechanism enhances the contrast in the connectivity terrain and strengthens connections that would otherwise wash out due to lack of visitation while the system is awake. A deep sleep mechanism is also provided for preventing runaway strengthening of favored states, and also to encourage Weber Law compliance.

62 Claims, 7 Drawing Sheets

OTHER PUBLICATIONS

"Implementations of Neural Netwsork Models In Silicon," Stuart Mackie, hans P. Graf, and Daniel B. Schwartz, NATO Advanced Research Workshop, 1987, pp. 467–476.

"A Massively Parallel Architecture for a Self-Organizing Neural Pattern Recognition Machine," Gail A. Carpenter, Computer Vision, Graphics, and Image Processing, vol. 37, 1987, pp. 54–115.

"The Function of Dream Sleep," Francis Crick and Graeme Mitchison, Nature, vol. 304, 14 Jul. 1983, pp. 111–114.

"'Unlearning' Has A Stabilizing Effect in Collective Memories," J. J. Hopfield, D. I. Feinstein and R. G. Palmer, Nature, vol. 304, Jul. 14, 1983, pp. 158–159.

"Analog VLSI and Neural Systems," Carver A. Mead, pp. 79–96 and 113–117, (preliminary 2 version dated 11/5/87).

Hoffman & Benson, "Neurons With Hysteresis Form a Network That Can Learn Without Any Changes in Synaptic Connection Strengths," Conf. Neural Networks for Computing, Snowbird, UT, U.S.A. 13–16 Apr. 1986.

Kosugi et al. "Considerations on Pattern Separation in Randomly Connected Layered Neuronal Networks," Systems Computers Controls, vol. 6, No. 5, 1975, pp. 68–76 (307/201).

SLEEP REFRESHED MEMORY FOR NEURAL NETWORK

This is a continuous of U.S. Patent Application Serial No. 222,887, filed July 22, 1988, now abandoned.

BACKGROUND OF THE INVENTION

1. Field of the Invention

The present invention relates to apparatus implementing a neural network, including a dynamic sleep refresh capability for reinforcing memory traces which might otherwise wash out over time.

2. Description of Related Art

A neural network is a highly parallel form of information processing apparatus, having as its philosophical basis the attempted modeling of the mammalian brain. A typical neural network comprises a large number of nodes, also called neurons or neuronal circuits, each intended to operate in some way analogous to a neuron in a mammalian brain. The neurons are connected to each other by synaptic connective circuits, also referred to as synapses or simply as connections, each intended to operate in some way analogous to a synapse in a mammalian brain.

Like the mammalian brain, the organization of a neural network is such that the each neuron is cross-coupled via synapses to a large number of other neurons in the network. The coupling in many cases is bi-directional and in some cases is uni-directional. Because of the philosophical basis for much of the work in the neural network area, it often happens that advances in the field help to improve the scientific understanding of the mammalian brain, and advances in brain research help to advance the state of the art of neural networks.

When a neural network operates, environmental input signals are provided to inputs of a subset of the neurons in the network. Following some algorithm, the signals propagate through the network and finally activate one or more output neurons representing a processed version of the input signals. For example, where the inputs are connected to the various pixels in a CCD imaging array, the outputs may be such as to specify which of the 26 letters of the alphabet is imaged on the CCD array.

Typically, the transfer functions by which information propagates through the network are modifiable according to a learning algorithm of some kind. In this way the network can learn to recognize different input patterns, depending on the environment to which it is exposed. Usually, the learning algorithm is either of a supervised form or of an unsupervised form. In a network which learns by supervised learning, the output response is measured against some predetermined correct output response either by a human or by an automatic supervisor. The network is then caused to modify its own transfer functions, often in dependence upon the difference between the actual and the predetermined output response, iteratively until the predetermined output response is achieved. The object of such a system is to have it find its own way to a predetermined relation between input signals and output responses.

In unsupervised learning networks, the network constructs its own distinctive output response for any given input signal. Such a network should itself be able to determine, for example, that different varieties of the letter "B" belong in a different category from the various forms of the letter "A". Such a network would modify its own transfer functions in order to provide a different output response for each category of input signals.

An example of a supervised learning algorithm is the so-called back-propagation algorithm, illustrated in U.S. Pat. No. 3,950,733 to Cooper. An example of an unsupervised learning algorithm is that discussed in Fukushima, "Neocognitron: A Hierarchical Neural Network Capable of Visual Pattern Recognition," Neural Networks, Vol. 1, pp. 119-130 (1988).

Another unsupervised learning algorithm is used in the ART-type networks proposed by Carpenter and Grossberg. See, for example, Carpenter and Grossberg, "A Massively Parallel Architecture For a Self-Organizing Neural Pattern Recognition Machine," Computer Vision, Graphics, and Image Processing, Vol. 37, pp. 54-115 (1987) ("Grossberg I") and Carpenter and Grossberg, "The ART of Adaptive Pattern Recognition by a Self-Organizing Neural Network," IEEE Computer (March 1988) at 77-88 ("Grossberg II"). In its simplest form, the ART network is composed of two layers F1 and F2 of neurons. The F1 layer is composed of a large number of clusters, each of which, in turn, is composed of a number of nodes with mutually inhibitory interconnections. Each of the input neurons or nodes takes in synaptic signals from three types of sources: one from environmental input stimuli, another from nodes in F2 (top-down connections), and a third from a global control mechanism. The F2 layer is also composed of clusters of nodes. Each F2 cluster has mutually inhibitory nodes only one of which is active at any one time. F2 activity is controlled by input from two main types of sources: one from F1 nodes (bottom-up connections) and the other from a resetting mechanism. Both top-down and bottom-up connections are Long-Term Memory (LTM) connections, meaning that the time-constants or decay constants of synaptic strengths are much longer compared to that of Short-Term Memory (STM) activity in F1 and F2. It is noteworthy that the output signals generated by the neurons are binary, indicating either active on inactive Analog activity levels generated internally to the neuron form only one of several parameters to the formula by which the binary outputs are generated.

The transfer functions according to which information propagates through the network usually have a predefined form with coefficients or other constants which are modifiable in accordance with the learning algorithm. For example, in the ART model, each neuron $v_k$ has a respective "STM activity" $x_k$ which obeys a membrane equation of the form:

$$\epsilon dx_k/dt = -x_k (1-Ax_k)J_k^+ - (B+Cx_k)J_k^-,$$

where $\epsilon$, A, B and C are constants, where $J_k^+$ is the total excitory input to $v_k$, and where $J_k^-$ is the total inhibitory input to $v_k$. Each of the values $J_k$ derives from an equation of the form $$J_k = \sum_l f(x_l) z_{lk},$$

where $v_l$ is a neuron the output of which influences neuron $v_k$, $f(x_l)$ is a fixed form binary output function of the internal activity level x in neuron $v_l$, and $z_{lk}$ is a coefficient which varies in accordance with the learning algorithm.

Coefficients such as z, which may be thought of as connectivity weights, can be stored as charge levels on a capacitor in each of many circuits implementing respective synaptic connections. Such implementations suffer from the problem that capacitors by their nature are imperfect, and lose charge over time. Current implementations therefore often use expensive CCDs or floating gate MOSFETs to retain memory as long as possible. In at least one instance, workers have even gone to the extent of cooling the capacitors to $-100°$ C. in order to stem leakage and prevent memory loss. Mackie, et al., "Implementations of Neural Network Models in Silicon," NATO ASI Series, Vol. F41, "Neural Computers," pp. 467–476, at 472 (1987). In other instances, memory is retained digitally. These technologies are expensive and do not lend themselves to optimal integration densities. No attempt has been made to stem charge loss through the use of circuitry.

In addition to gradual loss of memory due to charge leakage on the storage capacitors, such memory loss is sometimes intentionally designed into a system. For example, Carpenter and Grossberg recognized that even long-term mammalian synapses have a characteristic decay constant related to how fast the chemical transmitters/receptors are lost in the absence of preand post-synaptic activity. Their ART model therefore includes a so-called associative decay rule, which implies that some connectivity weights decay towards zero during learning See Grossberg I at 77.

While the associative decay rule models one aspect of the functioning of the mammalian brain, it is not perfect. As an illustration, suppose an ART system has learned six categories representing the letters A–F. Suppose further that for a long time thereafter, the system is presented with environmental inputs representing only the categories A–D. In the ART model, the memory traces by which the system recognizes the categories E and F will eventually wash out. However, we know that human beings can remember images and events that took place many years earlier, even without repetition of the stimuli.

It is therefore an object of the present invention to provide neural network apparatus in which memory traces are dynamically refreshed in order to counteract the loss of memory due to any cause.

SUMMARY OF THE INVENTION

According to the invention, a neural network system is provided which operates in at least two modes: one in which the system is "awake", and one in which it is "asleep". While the system is in its waking mode, it learns and solves problems according to any of the various prior art algorithms. When it is in its sleep mode, the system is isolated from its environmental inputs and the connectivity weights which have been learned until that point in time are adjusted according to some sleep refresh algorithm. The sleep refresh algorithm may be of a relatively unsophisticated type, in which the various connectivity weights are merely increased in fixed, or substantially fixed, proportion to their prior values. The algorithm by which this refresh activity takes place may also include an aspect which limits the increases in connectivity weights so as to prevent them from exceeding the electrical limitations of the system.

A more sophisticated sleep refresh. algorithm may be used in conjunction with another aspect of the invention, however. This aspect is based partially on the recognition that memory retention in the mammalian cortex is founded not solely on synaptic time constants, but also on the stochastic dynamism of the entire brain. Accordingly, a neural network system includes a large number of neurons, each responsive to a weighted sum of the outputs of at least a subset of the other neurons in the network. The terms in the sum are weighted according to connectivity weights, which are modifiable according to a learning algorithm described in more detail below. Not unlike prior art networks, the various neurons are interconnected in a topology which includes many feedback loops. For simplicity of illustration, the description of the invention describes a network which has only two levels of neurons: a first level, each neuron in which is responsive both to a respective environmental input signal and to each neuron in the second level. The second level neurons form a competitive cluster, in which the output of each of the second level neurons is positively responsive to each of the first level neurons and also negatively responsive to every other second level neuron in the cluster.

In prior art systems having this sort of topology, the output of each neuron was either "active" or "inactive". The neuron response equations would operate with the various feedback loops such that in response to a given input pattern, the network would, in effect, activate different ones of the second level neurons until the positive feedback through the loops is such as to reinforce the choice of one of the second level neurons. At this time the system is said to be in resonance, and the active second level neuron is said to represent the category to which the input pattern belongs. A network constructed according to this aspect of the invention, however, has analog activity levels as the neuron outputs. Further, the network is constructed so that the first level neurons have a non-zero activity level output even in the absence of environmental stimulus. In a network according to this aspect of the invention, not only will resonances be achieved when and input pattern is recognized, as in the prior art networks, but secondary resonances, characterized by low intensity firings of the neurons not due to environmental stimulus, will also take place due to the non-zero activity level outputs of the first level neurons.

Advantageously, the activity levels of the first level neuron outputs never fall below respective quiescent values, which values are low enough that the secondary resonances have little influence on the categories chosen by the system in normal operation. When the network is isolated from its inputs, however, the secondary resonances dominate since they are the only resonances present in the system. The recursive nature of the network then causes various ones of the second level neurons to fire (i.e., rise to a temporary high activity level) in a pseudo-random sequence dictated by the topology of the network, the past history of the activity levels of the various neurons, and the connectivity weights quantifying the extent to which the outputs of the neurons influence the activity levels of the other neurons. These secondary resonances continue until inputs are once again applied to the system, at which time the primary resonances resume their dominance. Alternatively or additionally, whatever mechanism ensures the non-zero activity level outputs of first level neurons may be disengaged or suppressed when the network is awake and activated when the network is asleep.

In accordance with the invention, whatever learning algorithm is used while the network is awake remains active while the network is asleep. Learning algorithms usually are adapted to reinforce the connections which generated a resonance, and to weaken the connections which generate a faulty choice of categories. Consequently, when the network is in its sleep mode, the connections which cause secondary resonances are strengthened. Moreover, since the pseudo-random sequence by which the various second level neurons fire depends on the connectivity weights of the connections abutting the second level neurons, it will be seen that those second level neurons which have strong connections to first level neurons, or which are activated by a large number of first level neurons, will fire more often than those second level neurons which have a weaker connection with first level neurons, or which are activated by a smaller number of first level neurons. Since the learning algorithm strengthens connections when they are used, the learning algorithm will in effect strengthen all the connections roughly in proportion to their relative weights as they existed at the onset of sleep.

A problem may arise if the connections to one of the second level neurons become too strong. These neurons fire more often than other neurons, thereby further increasing the strength of all connections abutting them. The condition is regenerative because connections abutting such favored second level neurons will strengthen more quickly than other connections. This in turn causes such favored states to be even more favored because of increased feedback between the first and second level neurons that represent those states. The strength of these connections may increase indefinitely at the expense of the inactive connections. Instead of contrast-enhancing the connectivity field, therefore, the network may lose some memory that is never exercised.

Advantageously, therefore, a network according to the invention includes a mechanism to detect the presence of favored states during sleep, and to check their regenerative advances to prevent such states from overwhelming the system. Preferably, the deep sleep mechanism observes the activity levels of one or more of the second level neurons and, if a favored neuron is detected, reverses the sense by which the connections to that neuron learn. That is, instead of strengthening the connections which are exercised, the learning algorithm will weaken those connections which are exercised.

In a preferred embodiment, the deep sleep mechanism generates an analog deep sleep signal coupled to each of the synaptic connections which abut the second level neuron(s) being watched by the deep sleep mechanism, and causes learning to slow more and more as such second level neurons become more favored. The learning sense passes through zero as the neurons become even more favored, and becomes increasingly negative as favoritism further increases. Such a mechanism may be connected to watch either a single second level neuron, in which case its deep sleep signal is connected to affect only the connections abutting that second level neuron, or it may be coupled to observe the outputs of all the second level neurons in the cluster, in which case the deep sleep signal is connected to all the connections abutting any of such second level neurons. Since the learning algorithm affects only those connections which are exercised, only those connections which form part of the favored states Will be affected by the deep sleep signal. in all cases, only the connections which couple the outputs of first level neurons to inputs of second level neurons ("feed-forward" connections) are affected by the deep sleep signal; connections in the opposite direction are allowed to strengthen to their strongest values. Further, as will be seen, the deep sleep mechanism enhances compliance with the Weber Law Rule.

BRIEF DESCRIPTION OF THE DRAWINGS

The invention will be described with respect to particular embodiments thereof, and reference will be made to the drawings in which:

FIG. 7 shows waveforms of various nodes in the neuronal circuit of FIG. 3;

FIG. 8 shows a connectivity field developed by a network according to the invention in response to certain input patterns;

DETAILED DESCRIPTION

Figure 1:
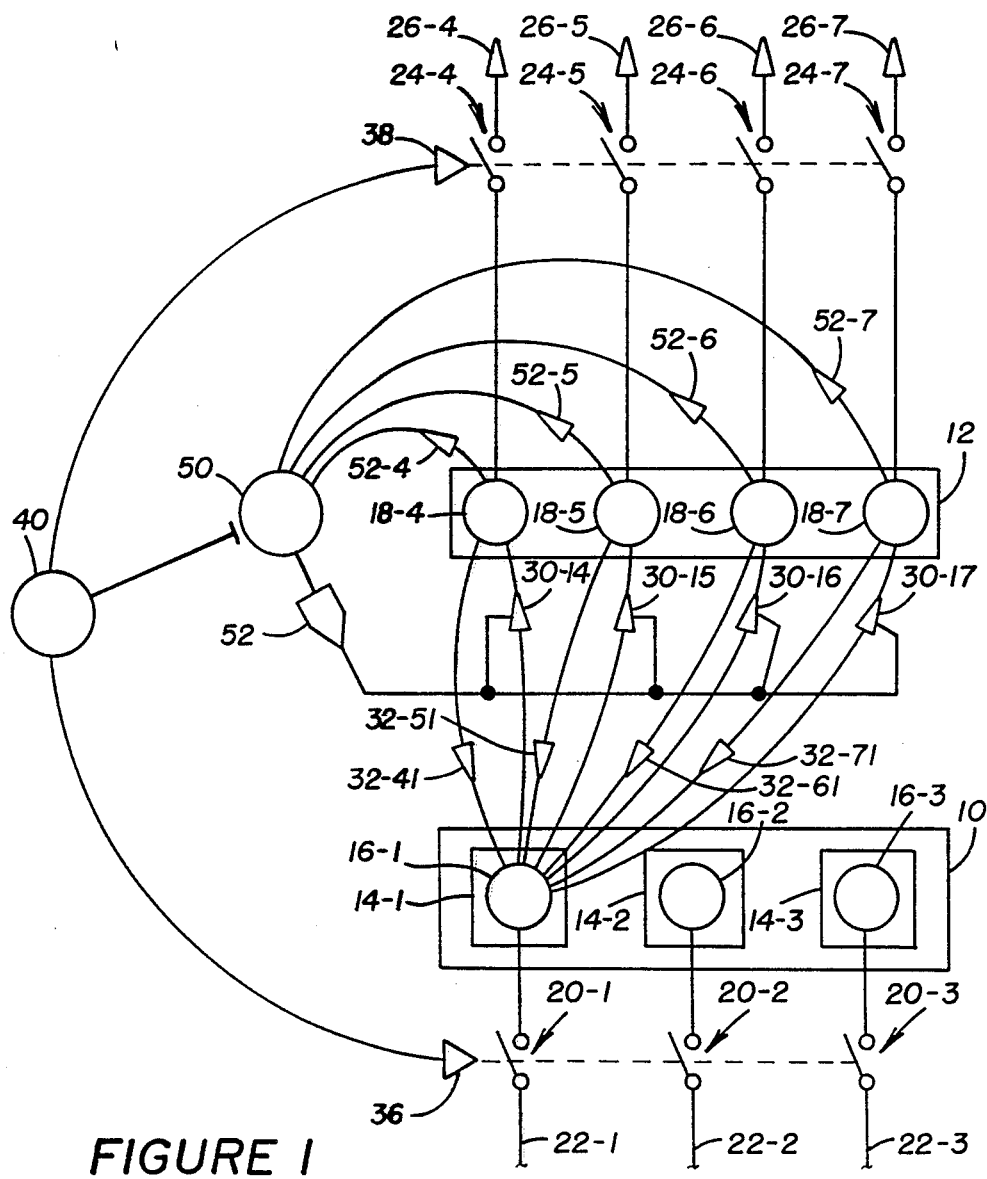
FIG. 1 is a block diagram of a neural network according to the invention.

In FIG. 1 there is shown a block diagram of a neural network according to the invention. The apparatus shown in FIG. 1 may either be an entire neural network, or it may represent only a portion of a much larger neural network. The network includes two levels 10 and 12 of nodes or neurons, with a plurality of connection circuits coupling them together. The neurons in the first level 10 are organized into clusters 14-1, 14-2 and 14-3, each containing a single neuron 16-1, 16-2, and 16-3, respectively. The clusters 14-1, 14-2 and 14-3 could contain more than one neuron each, but for simplicity of illustration, only single neuron first level clusters are shown.

The second level neurons 12 are organized into a single cluster of mutually competitive neurons 18-4, 18-5, 18-6 and 18-7. The second level could include other clusters of neurons as well, but for simplicity only the one cluster is shown.

Each of the neurons 16 in the first level neurons 10 has an input connected through a respective isolation switch 20-1, 20-2 and 20-3 to respective environmental inputs 22-1, 22-2 and 22-3. As will be seen, the inputs 22 may either connect to the outputs of other neurons on a different level, or may connect through input circuitry of some kind to the external environment. Each of the neurons 16 also receives input signals from all of the second level neurons 18 in a manner described below, so that a large number of signals are received by each of the neurons 16. Semantically, it is equivalent to think of these signals as being provided to separate inputs of the neuron, and then combined, or as being combined and provided to a single input of the neuron. In the circuit embodiment described below, for example, all the input signals are connected together to a common circuit node. Each neuron in the first level 10 also includes a plurality of outputs which, similarly to the inputs, may be considered a single output.

The neurons 18 in the second level 12 are preferably the same as those in the first level 10. Like the neurons in the first level 10, the neurons in the second level 12 each have a plurality of inputs (which may be considered a single input) and a plurality of outputs (which may be considered a single output). The environmental output of each of the neurons 18 is coupled through a respective isolation switch 24-4, 24-5, 24-6 and 24-7 to a respective output circuit 26-4, 26-5, 26-6 and 26-7.

The output of each of the first level neurons 16 is coupled through feed-forward circuits 30 to inputs of each of the second level neurons 18. These circuits are referred to as feed-forward connection circuits since the destination neuron to which they connect, also referred to as post-synaptic neurons, are neurons from which environmental output signals are taken. Thus, the output of neuronal circuits 16-1 is coupled via feed-forward connection circuits 30-14, 30-15, 30-16 and 30-17 to the respective second level neurons 18-4, 18-5, 18-6 and 18-7. These are the only feed-forward connection circuits shown in FIG. 1, for simplicity of illustration, but it will be understood that each of the first level neurons 14-2 and 14-3 too, are coupled via respective feed-forward nodes to each of the four second level neurons 18. A total of 12 separate feed-forward connection circuits are included.

Similarly, each of the second level neurons 18 is coupled via feed-back connection circuits 32 to inputs of each of the first level neurons 16. Shown in FIG. 1 are feed-back connection circuits 32-41, 32-51, 32-61 and 32-71, coupling outputs of respective second level neurons 18-4, 18-5, 18-6 and 18-7 to the input of first level neuron 16-1. The output of each of the second level neurons 18 is also coupled via feed-back circuits (not shown in FIG. 1) to the input of each of the first level neurons 14-2 and 14-3.

The designators by which the various elements are referenced in FIG. 1 are chosen for convenience of this description. In particular, the first level neurons 16, and each of the elements in FIG. 1 which correspond one-to-one with the respective first level neurons 16, are given the suffixes 1, 2 and 3. Similarly, the second level neurons 18, and all of the elements in FIG. 1 which correspond one-to-one with the respective neurons 18, are given the suffixes 4, 5, 6 and 7. Thus seven neurons are shown; neurons 1, 2 and 3 are in the first level and neurons 4, 5, 6 and 7 are in the second level.

The connection circuits 30 and 32 are given suffixes which represent the source and destination of the information which they transmit. For example, feed-forward connection circuit 30-17 couples the output of neuron I to the input of neuron 7, and feed-back connection circuit 32-51 couples the output of neuron 5 to the input of neuron 1. In general, there are N neurons, M of which are in the first level and N-M of which are in the second level. Feed-forward connection circuits 30-ij couple the output of each i'th neuron to the input of each j'th neuron, and feed-back connection circuits 32-ji couple the output of each j'th neuron to the input of each i'th neuron, $i=1, \ldots, M$ and $j=M+1, \ldots, N$.

The isolation switches 20-1, 20-2 and 20-3 are all controlled by a common buffer 36, the input of which is connected to receive a network mode signal. Similarly, isolation switches 24-4, 24-5, 24-6 and 24-7 are all controlled by a common buffer 38, also connected to receive the network mode signal. In both cases the connection is such that the isolation switches are open when the mode signal is inactive (indicating that the system is "asleep"), and closed when the mode signal is active (indicating that the system is "awake"). The network mode signal is generated by circuit 40, which may do so periodically, or only in response to a manual input.

In order to implement the deep sleep mechanism, the network of FIG. 1 further includes a deep sleep neuron 50. As will be seen, the deep sleep neuron 50 is similar, but not identical, to the neurons 16 and 18. Signal inputs to the deep sleep neuron 50 are coupled via respective "special" connection circuits 52-4, 52-5, 52-6 and 52-7 to the outputs of the respective second level neurons 18, and the signal output of deep sleep neuron 50 is coupled via a pulse extender 52 to respective deep sleep control inputs to each of the feed-forward nodes 30. The deep sleep neuro 50 also has an inhibitory input coupled to receive the network mode signal from mode signal source neuron 40. Also included in the network of FIG. 1, but not shown, are inhibitory connection circuits coupling the output of each of the second level neurons 18 to each of the other second level neurons 18.

As previously mentioned, unlike prior art networks, the signals transmitted between neurons represent analog activity levels rather than binary indications of whether a neuron is firing. According to an aspect of the invention, the analog activity level is represented as a binary pulse signal having an analog frequency. Preferably, the higher the frequency of the pulses, the higher the activity level represented. Additionally, the frequency of the output signal of any of the first level neurons never falls below a quiescent positive frequency. These features will become apparent following a description of the circuitry involved.

Neuron Circuit

Figure 2:
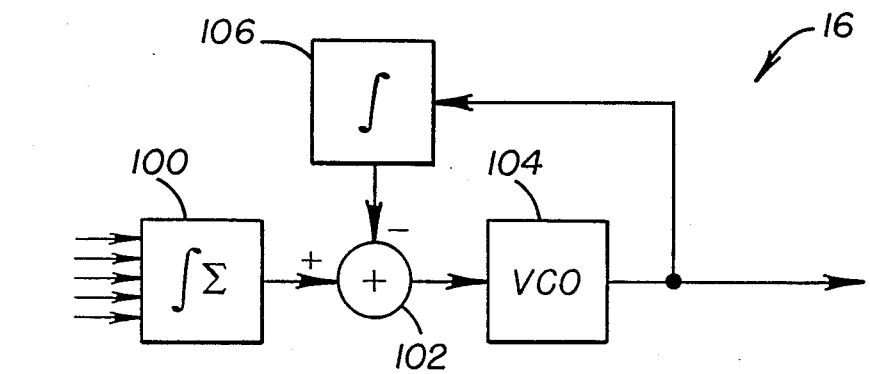
FIG. 2 is a functional block diagram of a neuron according to the invention.

FIG. 2 shows a functional diagram of a node or neuronal circuit 16 or 18 according to the invention. It comprises an input block 100, Which generates a time integration of the sum of the activity levels of the input signals to the neuron. The output of the input block is summed with other signals, in a summer 102 described below, and forms an input to a voltage-controlled oscillator (VCO) 104. For first level neurons, a constant term C is also connected to the neuron circuit, either as an additional input to the input block 100, or as an adding input of summer 102. The VCO 104 generates a signal having a frequency responsive to the voltage on its input. That signal is integrated by another integrator 106, also called a regulator, the output of which forms a subtracting input to summer 102. While this Figure shows how the neuron operates functionally, it will be understood that actual circuit implementations may not be neatly divisible into the functional blocks shown.

Three aspects of FIG. 2 should be noted. First, the output frequency of the neuron will increase rapidly when the sum of the frequencies of the input signals increases rapidly. Similarly, a sudden drop in the sum of the input frequencies will yield a relatively sudden drop in the neuronal output frequency. There will be some smoothing and delay introduced by the integration function of the input block 100, which will depend upon the time period over which the input signals are integrated. In general, the shorter the time period over which they are integrated, the more quickly and faithfully the output frequency of the neuron will follow the sum of the input frequencies.

Second, a sustained high activity level on the inputs of the neuron will not yield a sustained high activity level on the output, since the output of regulator 106 will gradually increase. Since the output voltage of regulator 106 subtracts from the output voltage of input block 100 by summer 102, a higher output voltage of regulator 106 will reduce the control voltage input to VCO 104 and thereby gradually return the output frequency of the neuron to a lower value. If the activity levels of the inputs to the neuron subsequently fall, the neuronal output frequency will fall initially, and then due to regulator 106, gradually return to a higher value.

Third, the function of regulator 106 does not completely counteract steady-state frequency changes on the neuronal output; it merely tempers them gradually over time. Thus, the inclusion of a constant term as an input to input block 100 or to summer 102 in first level neurons ensures that the steady state output frequency of the neuron will never fall below some quiescent value.

Figure 3:
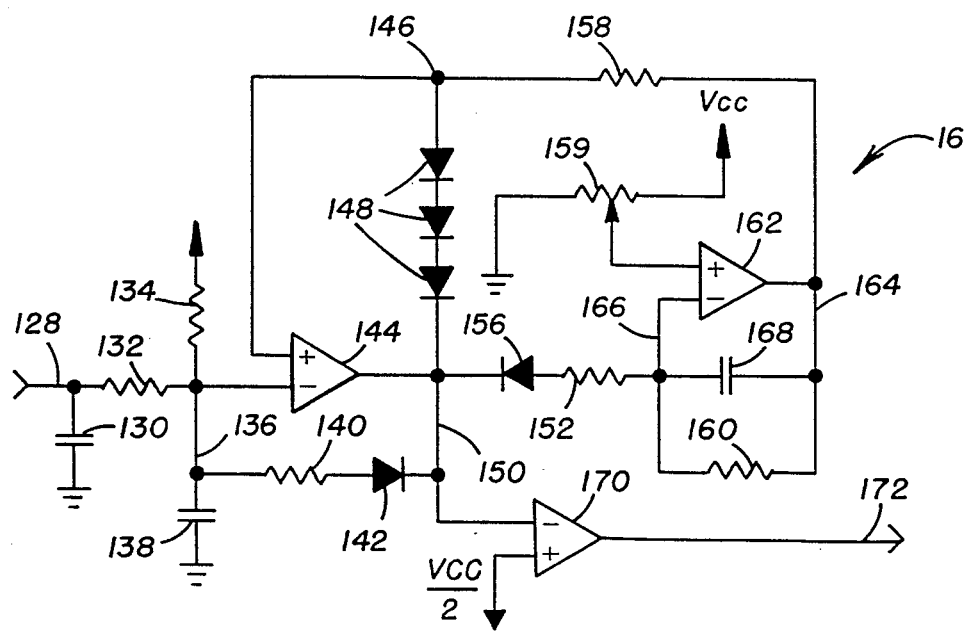
FIG. 3 is a schematic diagram of a neuron according to the invention.

FIG. 3 is a circuit diagram of a suitable neuronal circuit implementing the functions of the neuron of FIG. 2. It consists of a summing capacitor 130 having one terminal tied to ground and the other terminal tied to an input 128 of the circuit. The input 128 is also coupled through a resistor 132 to the inverting input node 136 of a comparator 144. The inverting input node 136 is also connected through a resistor 134 to Vcc, and through a capacitor 138 to ground. The non-inverting input 146 of the comparator 144 is coupled through a series of three diodes 148 to the output node 150 of the comparator 144. The inverting input 136 of the comparator 144 is also connected through a resistor 140 and a parallel diode 142 to the output node 150 of the comparator 144.

The non-inverting input 146 of the comparator 144 is also connected through a resistor 158 to the output of another comparator 162. The inverting input of the comparator 162 is coupled through a resistor 152 and a series diode 156 to the output 150 of the comparator 144. It is also coupled through a capacitor 168 and parallel resistor 160 to the output 164 of the comparator 162. The non-inverting input of comparator 162 is connected to the tap of a potentiometer 159, the two ends of which are connected, respectively, to Vcc and ground. The output node 150 of the comparator 144 is also connected to the inverting input of an output comparator 170, the non-inverting input of which is connected to Vcc/2. The output 172 of comparator 170 forms the output of the neuronal circuit 16 or 18.

Input 128 of the neuronal circuit 16 or 18 is both a temporal and spatial summing point, meaning that it integrates not only the variations in time of each input, but also the current contributed by all the inputs. Connections from other neurons to this neuron all converge at the point 128, where current from such connections are summed and integrated over time by capacitor 130. The time period over which these signals are integrated is a rather complex issue, but it will be seen that because of the current draw through resistor 132 into capacitor 138, the integration is heavily weighted in favor of input signals occurring since the most recent pulse of the neuronal output signal.

Resistor 132 transfers electrical charge from the integrating capacitor 130 to regenerative capacitor 138 which, together with comparator 1 44, resistors 140 and 158, and diodes 142 and 148, form a simple oscillator. It can be seen that when this oscillator is in its quiescent state, it nevertheless outputs narrow pulses at a slow rate (for example, one pulse in 5 milliseconds). This is because even if there is no input current charging the integrating capacitor 130, current is still available through leakage resistor 134 to slowly charge the capacitor 138. In a second level neuronal circuit, leakage resistor 134 would be omitted (open circuited) to avoid a non-zero quiescent output frequency. It will be seen further that the non-zero quiescent output frequency of first level neurons can be generated by another mechanism alternatively or additionally to leakage resistor 134, such as by providing a source of low frequency current pulses to the input circuit nodes 128 of each of the fist level neurons 16.

The operation of the oscillator can be understood by assuming first that the output 150 of the comparator 144 is high. In this state, diodes 142 and 148 are all reverse biased, the voltage at node 146 equals that at node 164, and capacitor 138 begins to charge through resistor 134 (and also through resistor 132 if the voltage on the summing capacitor 130 is currently higher than the voltage at node 136). After some time, the charge on capacitor 138 reaches a point where the voltage at point 136 exceeds that at point 146. This causes comparator 144 to reverse its output voltage, and pull down toward ground the voltage at its output point 150. This action forward biases the diodes 142 and 148, pulling down the voltage at point 146 to a low threshold voltage $V_{thL}$ determined by the low output voltage of comparator 144 and the three diodes 148 Diode 142 at this point is also forward biased, beginning a discharge of the capacitor 138 through the resistor 140. Gradually, the voltage on the capacitor 138 will decrease until it falls below the low threshold voltage $V_{thL}$ on the node 146, at which time the comparator 144 will again reverse the voltage on its output 150 and raise it to a high level. Thus the amount of time for which the voltage at the output node 150 of the comparator 144 remains low, depends on the time constant of capacitor 138 With resistor 140. That time period is also lengthened to the extent of the current charging the capacitor 138 via resistors 132 and 134, but desirably the resistor values are chosen so as to minimize this influence.

When the voltage at the output node 150 of comparator 144 goes high, the capacitor 138 is once again gradually recharged by the currents through resistors 132 and 134, thereby repeating the cycle. It can be seen that the voltage output of comparator 144 is normally high except for a sequence of brief, low-going pulses. The duration of each of the pulses is substantially fixed and preferably kept short by choosing a small value for resistor 140. The duration of the high levels of the pulses is typically relatively much longer, and depends on the temporal and spatial sum of the input voltages stored on the summing capacitor 130: the higher the average voltage of the inputs, the shorter the duration of the high levels of the pulses on the output 150 of the comparator 144. Even with no input signal at all, however, the duration of the high levels is never permitted to exceed some maximum length, due to the charging current arriving through leakage resistor 134.

The comparator 170 operates merely to reverse the sense of the pulses on node 150, thereby generating at the output node 172 of the neuron a voltage signal consisting of a series of short high-going pulses separated by a time period dependent upon the average input activity level and the current through leakage resistor 134. Thus prior to consideration of the function of the regulator circuit in the neuron 16, the output of the neuron 16 will have a pulse frequency (activity level) responsive to a recent time average of the sum of the activity levels of the inputs to the neuron 16. For example, a sudden increase in the voltage at input node 128 will cause the neuron to "fire", a condition characterized by a temporary increase in the rate of the output pulses.

Maintaining the increased voltage level at point 128, however, does not maintain the increased rate of neuronal output pulses because the output pulse rate is also controlled by a regulating circuit composed of operational amplifier 162, capacitor 168, resistors 152 and 160 and diode 156. The voltage at point 164 is the high threshold voltage $V_{thH}$ of the oscillator, representing the voltage to which the capacitor 138 must charge in order for the voltage at point 136 to exceed that at point 146. It tends to increase as the output frequency increases because of the charging action of diode 156 and resistor 160 on capacitor 168. This effect eventually decreases the output frequency. Thus, the neuron is sensitive not only to the instantaneous voltage level at its input summing junction 128, but also to changes in that voltage level.

The potentiometer 159 defines a resting potential for the regulator circuit of the neuron. In an integrated implementation, this potentiometer could of course be replaced by fixed resistors. In the absence of pulses on the output node 150 of the comparator 144, resistor 160 discharges the capacitor 168 to thereby cause the voltage at point 164 to decay toward the resting potential. Resistor 152 and diode 156 pull down the point 166 whenever the point 150 pulses down. This charges capacitor 168 and raises the high threshold voltage at point 146.

Feed-Forward Synaptic Connection

Figure 4:
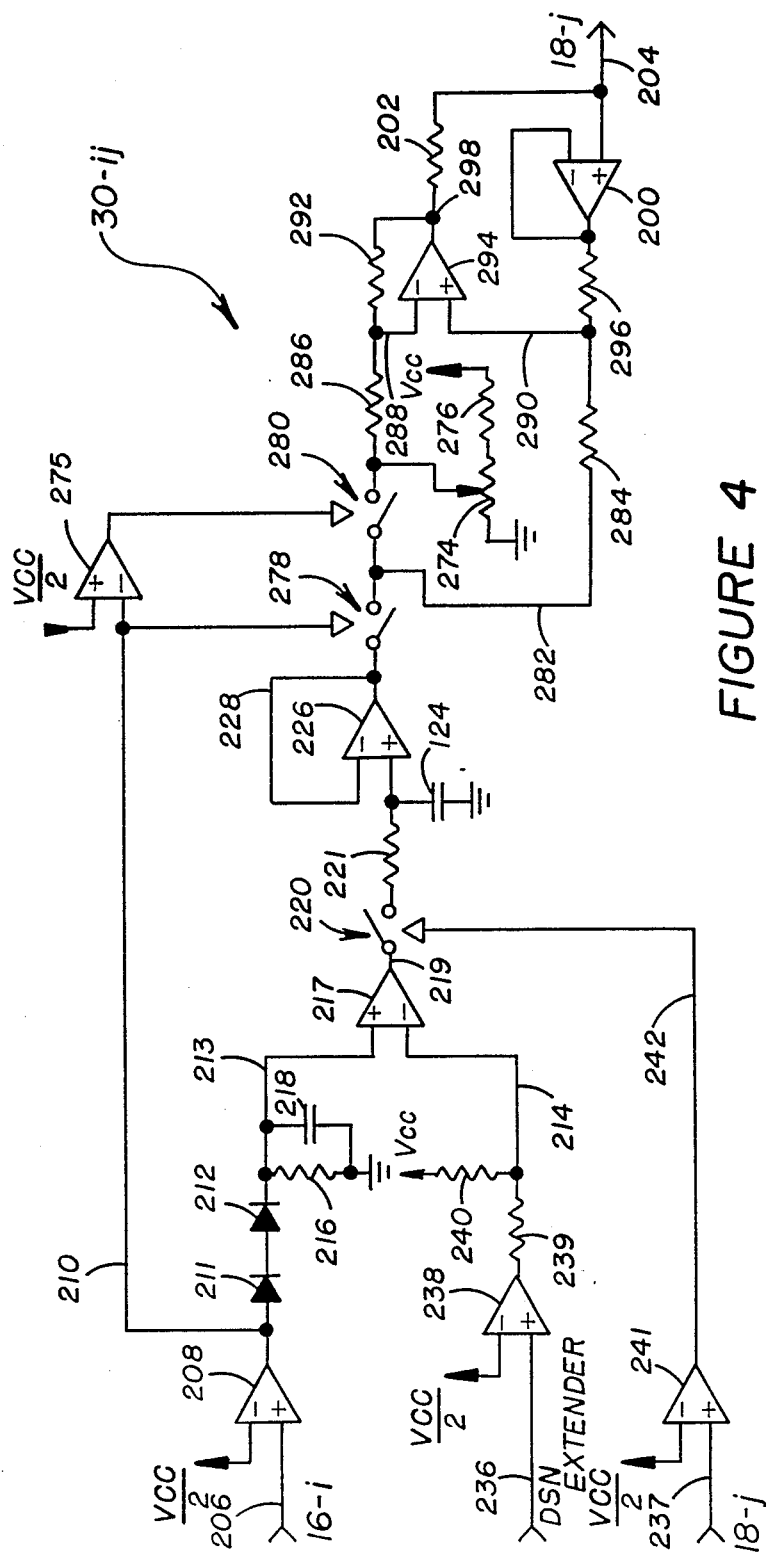
FIG. 4 is a schematic diagram of a feed-forward synaptic connection circuit.

In FIG. 4 there is shown a schematic diagram of a circuit suitable for implementing one of the feed-forward synaptic connections 30-$ij$. It is assumed that the synaptic connection shown in FIG. 4 couples the output signal of first level neuron 16-$i$ to the input of a second level neuron 18-$j$.

At the heart of the feed-forward synaptic connection 30-$ij$ is a capacitor 124, which stores a charge indicative of the connectivity weight $w_{ij}$ by which the information will be transferred. One terminal of the capacitor 124 is connected to ground, and the other terminal is connected through a unity gain buffer 226 to a first terminal 228 of a switch 278. The opposite terminal of the switch 278 is a voltage control node 282, and is also connected to one terminal of a switch 280. The other terminal of the switch 280 is connected to the tap of a potentiometer 274, one terminal of which is connected to ground and the other terminal of which is connected through a resistor 276 to Vcc.

The signal output of the first level neuron 16-$i$ connects to a signal input terminal 206 of the feed-forward synaptic connection circuit 30-$ij$. The signal input terminal 206 is connected through a comparator 208 to a circuit node 210. Comparator 208 serves as an impedance transducer and presents a very high input impedance to the pre-synaptic neuron 16-$i$. Such a high impedance input is important because there may be thousands of connection circuits connected to the same neuronal output. The impedance transducer 208 has its non-inverting input connected to the signal input terminal 206 and its inverting input connected to a Vcc/2 voltage.

The circuit node 210 is connected to the control terminal of the switch 278, and also through a voltage inverter 275 to the control terminal of switch 280. It can be seen that when a high level voltage is present on the signal input terminal 206, switch 278 will close and the voltage control node 282 will carry a voltage equal (except for an offset introduced by the follower 226) to the voltage on capacitor 124. The switch 280 will be open. When the signal input terminal 206 carries a low voltage, switch 278 will be open and switch 280 will be closed. Voltage control node 282 will carry a voltage, preferably a low voltage as explained below, dependent upon the resistor divider formed by resistor 276 and potentiometer 274. Any current through resistor 286 does not influence this low voltage since the value of resistor 286 is much greater than the value of resistors 274 and 276. Thus, the voltage on voltage control node 282 will oscillate between the low reference voltage and the voltage on capacitor 124, at a rate equal to the pulse rate of the signal output of first level neuron 16-$i$. The purpose of the adjustable voltage divider formed by resistors 274 and 276 is to provide a low voltage offset because the offset of follower 226 does not permit node 228 to go all the way to zero when the voltage on capacitor 124 is zero. The voltage divider therefore allows the transconductance converter, described below, to provide a real zero current when capacitor 124 has zero voltage.

The voltage control node 282 forms an input to a transconductance converter formed by voltage follower 200 and operational amplifier 294 as active components. The voltage control node 282 is connected through a resistor 284 to the non-inverting input 290 of op-amp 294, the output 298 of which is coupled through resistor 292 to the inverting input 288 of the op-amp 294. The inverting input of op-amp 294 is also connected through a resistor 286 to the tap of potentiometer 274. The output 298 of the op-amp 294 is further coupled through a resistor 202 to the non-inverting input of the voltage follower 200, the output of which is connected directly to its own inverting input. The output of follower 200 is further connected through a resistor 296 to the non-inverting input 290 of the op-amp 294. The non-inverting input of follower 200 also forms the signal output terminal 204 of the feed-forward synaptic connection circuit 30-$ij$, which is coupled to the signal input of the second level neuron 18-$j$.

The transconductance amplifier, as so constructed, injects current into the summing junction 128 (see FIG. 3) of the second level neuron 18-$j$ to which it connects. The amount of current which is injected is controlled by the voltage across resistor 202, independently of voltage variations at the current output terminal 204. Follower 200 senses the voltage at point 204 and presents the same voltage to a voltage divider formed by resistors 296 and 284, the tap of which is connected to the noninverting input of op-amp 294. The voltage at point 298 is fed back negatively to op-amp 294 through another voltage divider formed by resistors 292 and 286. Op-amp 294 maintains the voltage at point 298 such that the voltages at points 288 and 290 are approximately equal. It can be seen, therefore, that the current through resistor 202 is controlled by the voltage at voltage control node 282.

Thus, in conjunction with the storage capacitor 124, the switch 278 and 280, and associated circuitry previously described, the transconductance amplifier generates at the synaptic output terminal 204 a series of current pulses. These current pulses have a frequency and duration equal to that of the voltage pulses entering the feed-forward synaptic connection circuit 30-$ij$ at signal input terminal 206. The current level at the top of each pulse is dictated by the voltage on storage capacitor 124, and the current level between pulses is very small or zero. It can be said that the output node 204 of the feed-forward synaptic connection circuit 30-$ij$ carries an activity level approximately equal to $w_{ij}a_i$, where $a_i$ is the activity level output of the first level neuron 16-$i$ to which the input 206 of feed-forward synaptic connection circuit 30-$ij$ is connected.

The network of the present embodiment learns categories by strengthening those connectivity weights $w_{ij}$ in feed-forward synaptic connection circuits 30-$ij$, to the extent of simultaneous high activity levels on the outputs of both the first level neuron 16-$i$ and the second level neuron 18-$j$. If both neurons fire simultaneously, then the connectivity weight of the feed-forward synaptic connection circuit which couples them should be strengthened. The learning algorithm also holds that the connectivity weight $w_{ij}$ should be weakened to an extent governed by the concurrence of a high activity level on the second level neuron 18-$j$ and a low activity level on the first level neuron 16-$i$. If the activity level output of the second level neuron 18-$j$ has a low activity level, then all the connectivity weights $w_{ij}$, $i$-1, ..., M, should remain substantially unchanged regardless of the activity level of the outputs of first level neurons 16-$i$. The connectivity weights may weaken nevertheless, due to leakage in memory capacitors 124.

Accordingly, a learning circuit is included in the feed-forward synaptic connection of FIG. 4 for charging (or discharging) storage capacitor 124 only during the high levels of the pulses of the output of the second level neuron 18-$j$. If the voltage output of the first level neuron 16-$i$ (as extended by an extender described below) is high during a second level pulse, capacitor 124 will gain charge. If it is low, capacitor 124 will lose charge.

The output of impedance transducer 208, in addition to being connected to the control terminal of switch 278, is also connected through a diode 211 in series with a diode 212 to the non-inverting input 213 of a comparator 217. The non-inverting input 213 of the comparator 217 is also coupled to ground by a resistor 216 in parallel with a capacitor 218. A circuit input node 236 to the feed-forward synaptic connection circuit of FIG. 4 is coupled to the output of a deep-sleep neuron (DSN) extender, described below. The circuit node 236 is coupled through another impedance transducer 238 and series resistor 239 to the inverting input 214 of the comparator 217. The inverting input 214 of the comparator 217 is also connected through a resistor 240 to Vcc. The output 219 of comparator 217 is coupled through a switch 220 in series with a resistor 221 to the non-grounded terminal of the storage capacitor 124. The control terminal for switch 220 is connected to the output 242 of yet another impedance transducer 241, the input of Which is connected to a circuit input node 237. The circuit input node 237 receives the output signal from the second level neuron 18-$j$, which is the very same second level neuron which has an input connected to the output 204 of the feed-forward synaptic connection circuit 30-$ij$.

The pulse extender portion of the feed-forward synaptic connection circuit operates as follows. If the input 236 is low, resistors 239 and 240 form a voltage divider which provides a threshold voltage at the inverting input 214 of the comparator 217. When a pulse arrives at the signal input terminal 206, diodes 211 and 212 charge the capacitor 218 and thereby rapidly raise the voltage at the non-inverting input 213 of comparator 217, until it exceeds the threshold voltage at the inverting input 214. The output voltage 219 of the comparator 217 then goes high and remains high until resistor 216 discharges capacitor 218 sufficiently to drop the voltage of the non-inverting input 213 to a level below the threshold level on inverting input 214. The output pulse width is therefore determined by resistors 239, 240 and 216 and capacitor 218.

In accordance with a feature of the invention described in more detail below, it will further be seen that a high voltage level on circuit input node 236 will disable the pulse extender and force a low voltage on the output 219 of the comparator 217. This can be seen by noting that the output of impedance transducer 238 will be high, thereby bringing the threshold voltage at inverting input 214 to a high level. The voltage at the non-inverting input 213 should never exceed this high threshold voltage, due to the double diode voltage drop introduced by diodes 211 and 212, and the output voltage of the comparator 217 will therefore remain low. In accordance with an aspect of the invention described below, therefore, high-going pulses on the DSN extender output will override the storage capacitor charging action that would otherwise take place when high levels occur on the outputs of both the first and second level neurons 16-$i$ and 18-$j$ simultaneously, and instead cause the storage capacitor 124 to discharge through resistor 221 at a rate dictated by the frequency of pulses output from the second level neuron 18-$j$.

Feed-Back Synaptic Connection Circuit

Figure 5:
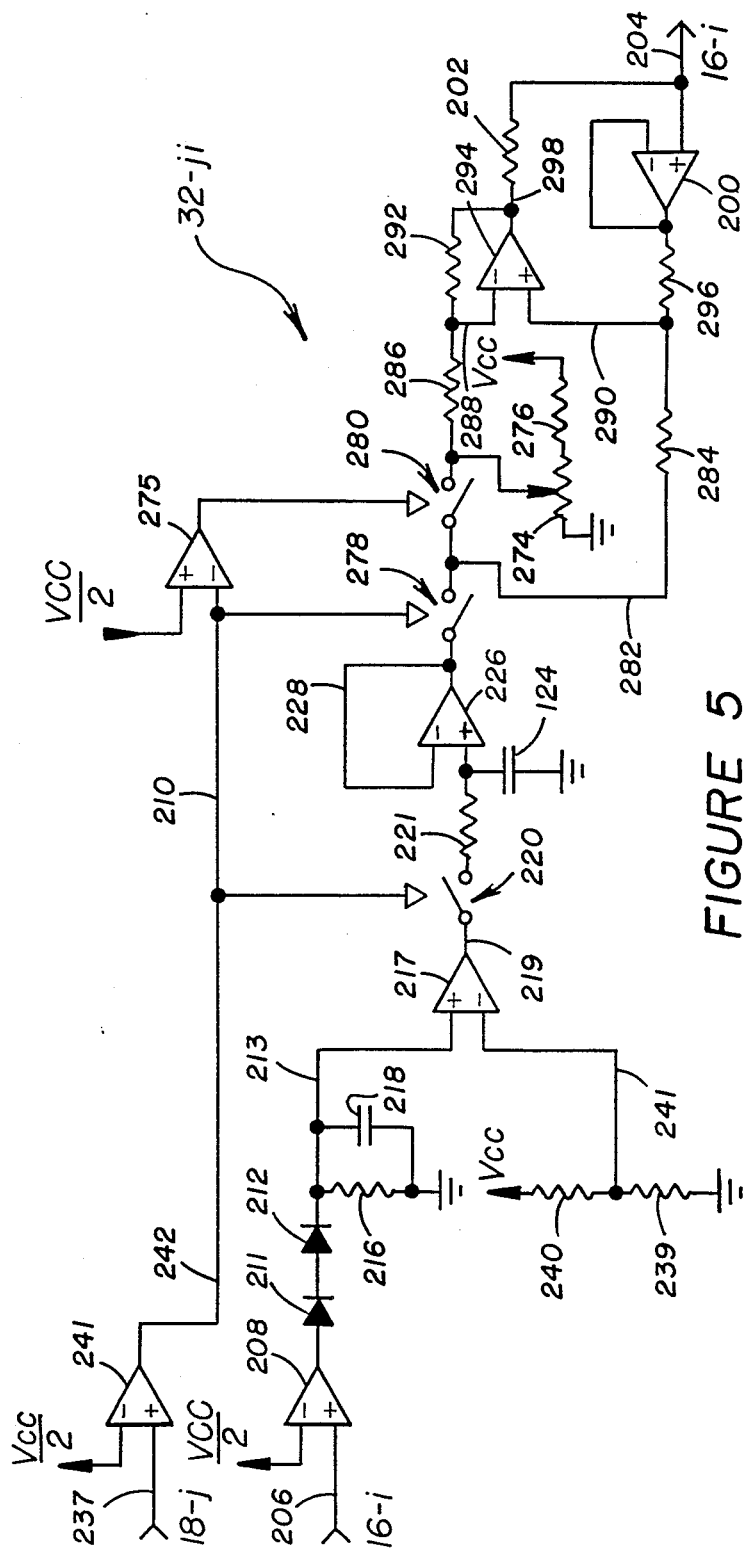
FIG. 5 is a schematic diagram of a feed-back synaptic connection circuit.

FIG. 5 shows a schematic diagram of a feed-back synaptic connection 32-$ji$. It is very similar to the feed-forward synaptic connection of FIG. 4, with certain exceptions. First, instead of being controlled by the first level neuron 16-$i$, the switches 278 and 280, which determine the frequency of the output pulses of the synaptic connection, are controlled by the output signal from second level neuron 18-$j$. This is accomplished by connecting the control input of switch 278, and the inverting input of voltage inverter 275, to the output of impedance transducer 241 instead of to the output of impedance transducer 208. The output of impedance transducer 241 remains connected to the control input of learning switch 220 for reasons which will be apparent below.

Second, instead of being connected to the signal input of second level neuron 18-$j$, the output 204 of the feed-back synaptic connection 32-$ji$ is connected to the signal input of the post-synaptic first level neuron 16-$i$.

The learning algorithm for a feed-back synaptic connection 32-$ji$ is the same as the learning algorithm for the feed-forward synaptic connection coupling the same two neurons. That is, the connectivity weight $w_{ji}$ should strengthen to the extent of concurrency of high activity levels in both the first level neuron 16-$i$ and the second level neuron 16-$j$, and should weaken to the extent of concurrence of a high activity level in the output of the second level neuron 18-j and low activity level in the output of the first level neuron 16-i. Thus the input 206 of the pulse extender circuit in the feedback synaptic connection circuit 32-ji remains coupled to the output of the first level neuron 16-i, as in the feed-forward synaptic connection circuit, and the circuit input node 237 in the feed-back synaptic connection circuit 32-ji, which controls the learning switch 220, remains coupled to the output of the second level neuron 18-j.

In one further difference between the feed-back synaptic connection circuit and the feed-forward synaptic connection circuit, as explained below, sleep refresh of the connectivity weights $w_{ji}$ in the feed-back synaptic connection circuits does not need to be checked by the deep sleep neuron. The feed-back synaptic connection circuit shown in FIG. 5 therefore omits the input 236, Which in the feed-forward synaptic connection circuit of FIG. 4 is connected to the DSN extender output, and instead couples the resistor 239 to ground. The resistor divider formed by resistors 239 and 240 therefore provide a fixed threshold voltage to the inverting input of comparator 217, thereby ensuring that the pulse extender is never disabled.

It should be noted that the switch 220 serves both as a refresh and a learning switch. Consequently, as far as any connection circuit is concerned, it does not matter whether the network of which it is a part is sleeping or learning; it functions the same way whether in sleep or learning (awake) mode.

Inhibitory Connection Circuit

Figure 6:
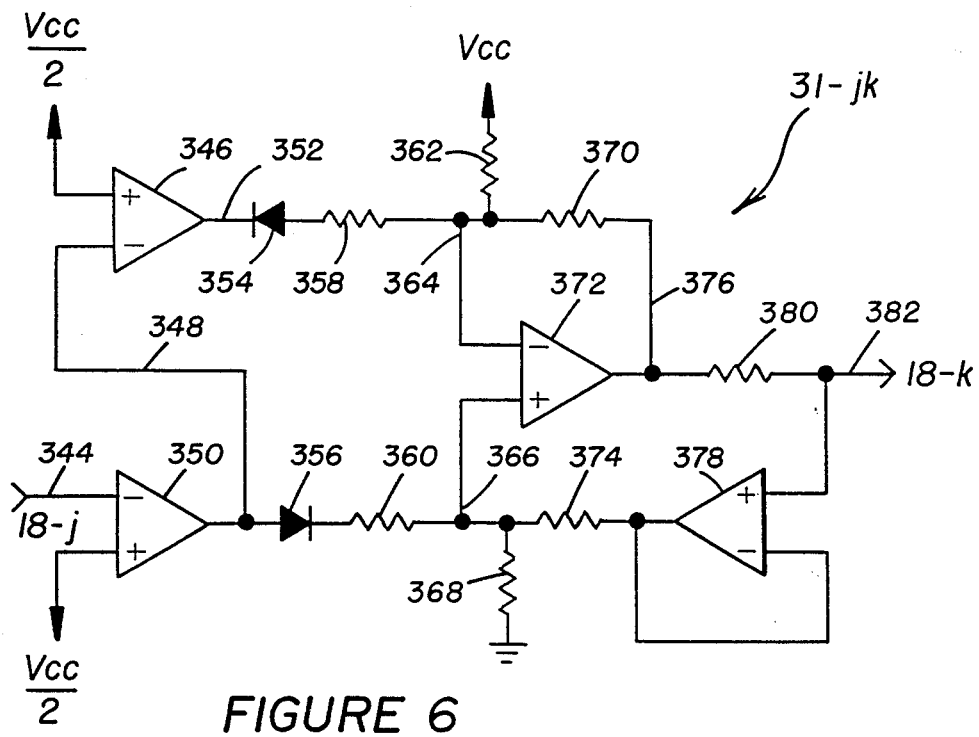
FIG. 6 is a schematic diagram of an inhibitory connection circuit.

FIG. 6 illustrates an inhibitory connection circuit. As previously mentioned, all the neurons in a second level cluster are mutually competitive. Mutual competition is accomplished by providing an inhibitory connection between the output of each of the second level neurons in the cluster and the input of every other one of the second level neurons in the cluster. The inhibitory connection circuit has a fixed connectivity weight which is negative, thereby making the activity level of the output of each of the second level neurons in the cluster negatively responsive to the activity level of each of the other second level neurons in the cluster. Thus, an inhibitory connection circuit such as that shown in FIG. 6 connects the output of each k'th second level neuron to the input of each j'th second level neuron, $j=M+1,\ldots N$, $k=M+1,\ldots,N$, $k\neq j$.

Inhibitory connection circuit 31-jk couples the output of second level neuron 18-j to an input of second level neuron 18-k. Thus the output of second level neuron 18-j connects to a circuit input node 344 of the inhibitory connection circuit 31-jk, and the output node 382 of the inhibitory connection circuit 31-jk connects to an input of second level neuron 18-k. Resistors 358, 360, 362 and 368 are all approximately equal, and the values of resistors 370 and 374 are approximately equal. The value of resistor 358 is proportional to the value of resistor 370 by a constant of proportionality K. The constant K determines the synaptic connectivity of the circuit because, as will be shown, it determines how much current is drawn from the post-synaptic neuron.

Inverter 350 inverts pulses coming in at input 344, while inverter 346 inverts them back to their original polarity. Voltage follower 378 and op-amp 372 maintain the voltage drop across resistor 380 at zero when input 344 is low as follows. Between pulses, the voltage at point 348 is high while that at point 352 is low, so that both diodes 354 and 356 are forward biased. Because resistors 358, 362, 360, and 368 are all of equal value, and because op-amp 372 maintains the voltage at point 376 such that the voltages at points 364 and 366 are equal, the currents through resistors 370 and 374 must be equal. And, since R370 = R374, the voltage at point 376 (referred to herein as V376) must equal V382. Thus, between pulses, the inhibitory connection circuit of FIG. 6 supplies zero current to the post-synaptic neuron 18-k.

When a pulse occurs, point 348 is low while point 352 is high. Both diodes 354 and 356 are therefore reverse biased. Using Kirchoff's Law at point 364, we have $$(VCC-V364)/R362=(V364-V376)/R370.$$

Similarly at point 366, $$(V366-0)/R368=(V382-V366)/R374.$$

Because op-amp 372 keeps V376 such that V364 is equal to V366, the above equations can be combined and rearranged to yield $$(1/K)^* VCC=V382-V376.$$

When a pulse occurs, therefore, a current proportional to $(1/K)Vcc$ is drawn from the postsynaptic neuron 18-k.

Network Operation

In order to understand the general operation of the network of FIG. 1, initially a single one 16-i of the first level neurons 16 and a single one 18-j of the second level neurons 18 to which it is coupled will be examined in isolation as if they formed a complete, albeit simple, network. The environment of this simple network consists of the rest of the much larger network.

As previously mentioned, neurons are electronic entities that output pulses all the time, even when they are in a quiescent state. A neuron is said to fire when the frequency or rate of the pulses it generates increases rapidly to a rate which is much faster than the quiescent rate. Recalling the operation of a neuron such as that in FIG. 3, it will be appreciated that a sufficiently quick increase in the input activity levels will cause the neuron to fire. For first level neurons 16, these input activity levels come either from environmental inputs or from the second level neurons 18 to which its inputs are coupled. Recalling the operation of feed-back connection circuit 32-ji, it will be appreciated that the activity level received by the first level neuron 16-i from a second level neuron 18-j equals $w_{ji}f_j$, where $w_{ji}$ is the connectivity weight of the connection from second level neuron 18-j to first level neuron 16-i, and where fj is the output frequency of second level neuron 18-j. Thus a high activity level on second level neuron 18-j can cause first level neuron 16-i to fire, but only if the connectivity weight $w_{ji}$ is sufficiently strong.

For second level neurons 18, the input activity levels come from the first level neurons 16 to which its inputs are coupled. Like the first level neurons 16, it will be appreciated that a second level neuron 18-j can be caused to fire by a first level neuron 16-i, but only if the connectivity weight $w_{ij}$ is sufficiently strong.

Consider first a two-neuron network in which the connectivity weights $w_{ij}$ and $w_{ji}$ are weak. In this situation there is no inherent reason for both neurons to fire simultaneously. At any given time, therefore, it is much more likely that neither or only one of the neurons is firing, than it is that both are firing. The timing of the pulses generated by first level neuron 16-$i$ therefore will rarely correlate with the timing of the pulses generated by second level neuron 18-$j$, and the synaptic connectivity weights $w_{ij}$ and $w_{ji}$ will remain low. They will actually be reduced if the second level neuron 18-$j$ is firing when the first level neuron 16-$i$ is quiescent.

Now consider a two-neuron network in which the connectivity weights $w_{ij}$ and $w_{ji}$ are strong. In this situation a high activity level on either of the neurons strongly and positively influences that of the other neuron, significantly increasing the probability that they will fire in synchrony. (Note that the high activity levels of neither neuron will be sustained for long due to the dampening effect of regulator circuit 106 (FIG. 2) in each of the neurons.) Since the peaks of the voltage output waveforms of the two neurons will now occur simultaneously more often, the connections between them will strengthen. However, since there can be no regularity in the environment, there will nevertheless be intervals of time greater than the time constant of connection decay in which the two neurons fire less synchronously than is normally the case. In these intervals, according to the learning algorithm chosen and described above, and also according to the operation of the network implementation described above, the connectivity weights $w_{ij}$ and $w_{ji}$ will weaken.

In order to counter undesirable loss of memory due to this reason or to simple charge leakage, the inventive network includes a sleep mode into which the network is placed occasionally. The sleep mode is defined herein to refer to the physical isolation of a neural network from its environment such that all input to the network is shut off. Outputs may also be disconnected, since their activation during sleep has little meaning. As will be seen, the network will randomly traverse its state space on its own.

In the case of the two-neuron network, only four states exist. The first state is visited when both the first level neuron 16-$i$ and the second level neuron 18-$j$ are quiescent ("off"); the second, when the second level neuron 18-$j$ is quiescent and the first level neuron 16-$i$ is firing ("on"); the third, when the second level neuron 18-$j$ is firing and the first level neuron 16-$i$ is quiescent; and the fourth, when both neurons are firing simultaneously.

As previously discussed with respect to FIGS. 2 and 3, each neuron by itself is already an oscillator. As has been noted, for first level neurons, this primary oscillation occurs even when the neuron is in a quiescent state. The two neurons in the network and the two connections between them form still a third feedback oscillator that causes the frequency f of each neuron to oscillate. The spontaneous modulation of frequency, referred to herein as secondary oscillation, occurs as follows. Assume a start state in which both neurons are Off. The quiescent pulses from the first level neuron is temporally summed at the summing input of the second level neuron, thereby increasing the charge on summing capacitor 130 (FIG. 3) in the second level neuron. The magnitude of the increase brought about by each incoming pulse is proportional to the charge on the capacitor 124 (FIG. 4 or 5) of the feed-forward connection circuit. This increase helps to speed up the charging of capacitor 138 (FIG. 3) in the second level neuron through resistor 132 so that capacitor 138 becomes charged more and more quickly on each of the primary oscillation cycles of the second level neuron. Since the rate of charge build-up on capacitor 130 is proportional to the charge on connectivity weight capacitor 124 in the feed-forward connection circuit, the rate of frequency build-up in the second level neuron is also proportional to the charge on connectivity weight capacitor 124. The increase in frequency of the primary oscillation in the second level neuron is fed back via the feed-back connection circuit to the first level neuron, thereby increasing the frequency of the primary oscillation in the first level neuron. This in turn causes further speed-up in the charging of capacitor 138 in the second level neuron. An avalanche effect results until both neurons reach high frequencies. Both neurons then are said to be on.

Each neuron will stay on until the charge on its respective capacitor 168, in the regulator circuit, builds up to that point at which the frequency of the primary oscillation drops back toward its respective quiescent value. The secondary oscillatory cycle then repeats itself. The rate at which avalanche will occur (i.e. the frequency of the secondary oscillation) depends on the initial charge on capacitor 124 in each connection circuit.

In FIG. 7 there are shown several graphs of neuron activity when the summed input voltage on capacitor 130 increases and then decreases. Curve 400 shows the voltage V130 on capacitor 130. Neuron response, measured as the rate f of pulses produced on circuit output node 172, is shown in curve 402. The regulator voltage V164 is shown as curve 404. Note that although f increases with V130, the decay of f can be more rapid than that of V130 because the rise in the regulator voltage V164 of the neuron has an inhibiting effect (decreases neuron pulse frequency f). Thus a neuron has two main internal states: an inhibitory state in which capacitor 168 is charged, V164 is high, and response to the summed input voltage V130 decreases; and an accommodation state in which V164 is low and the neuron is sensitive to changes in the summed input voltage V130. The exact length of the inhibitory state is not important, as explained in more detail below, as long as it is long enough to discourage firing of the same neurons twice in a row.

It can be seen that the secondary oscillation is the main mechanism by which capacitor 124 retains its charge. If the connection strength between the two neurons in the two-neuron network is high at the onset of sleep, the first state (off-off) and the fourth state (on-on) are favored by the network over the second state (on-off) and the third state (off-on). The outputs of the two neurons increase and then decrease in frequency, firing simultaneously more often than not, thereby preserving and strengthening the previous synaptic strengths which caused such harmonious firing originally. With every resonant firing, the charge on memory capacitor 124 is refreshed through switch 220 (FIG. 4 or 5).

If the connection strength between the two neurons in the network is low at the onset of sleep, then the second and third states will be favored. The second state (on-off) has little if any effect on the connectivity weights, and the third state (off-on) will actually weaken the connectivity strengths. In general, the rate of simultaneous firing depends on the initial connectivity weights $w_{ij}$ and $w_{ji}$, and the time constants by which these connectivity weights change. Thus, since the secondary oscillations by which the network wanders through its state space occur spontaneously when the network is isolated from its environment (asleep), the contrast between the various connectivity values throughout the connection field is thereby increased during sleep. Any washing out of responses which have been learned but not recently visited during wakefulness, are counteracted.

Multi-Neuron Network

Referring to the network of FIG. 1, a network will be considered which includes three first level neurons 16 and four second level neurons 18. Suppose that this network is taught to distinguish four input pattern combinations as follows:

| Input Pattern | First Level Neuron | | |
|---|---|---|---|
| | 16-1 | 16-2 | 16-3 |
| No. 1: | OFF | OFF | ON |
| No. 2: | OFF | ON | ON |
| No. 3: | ON | OFF | ON |
| No. 4: | ON | ON | ON |

Because all the second level neurons 18 in the network belong to the same cluster in which all neurons are mutually competitive, it can be expected that each one of the four second level neurons 18 will come to recognize a different one of the four input patterns.

FIG. 8 illustrates connections that may develop as a result of learning the four patterns. In this Figure only the strong connections are shown, and the feedforward connection and the feed-back connection are both shown together as a single line. It can be seen that Input Pattern No. 3 (ON-OFF-ON), for example, will cause resonance between second level neuron 18-5 and both first level neurons 16-1 and 16-3, indicating that second level neuron 18-5 recognizes the third input pattern. That is, when the third input pattern is presented to the first level neurons 16, second level neuron 18-5 is the neuron that will fire. Similarly, it can be seen that second level neuron 18-7 recognizes the first input pattern (OFF-OFF-ON), second level neuron 18-6 recognizes the second input pattern (OFF-ON-ON), and second level neuron 18-4 recognizes the fourth input pattern (ON-ON-ON). Depending on the sequence in which the input patterns were presented to the network, and depending on the pre-learning initial connectivity values, a different correlation between input patterns and second level neurons could have been learned instead.

Note that the connections between second level neuron 18-6 and each of the first level neurons 16-2 and 16-3 will be weaker than that between second level neuron 18-7 and first level neuron 16-3. Otherwise, if input pattern No. (off-off-on) is applied to the input neurons 16, then second level neuron 18-6 will receive a signal as strong as that received by second level neuron 18-7. Depending on past history and other factors, second level neuron 18-6 may win out over second level neuron 18-7. This is undesirable since second level neuron 18-7, judging by the connections shown in FIG. 8, is the proper neuron to react to input pattern No. 1. On the other hand, if the connections abutting second level neuron 18-6 are weaker than the connection abutting second level neuron 18-7, second level neuron 18-7, properly, will be the neuron which will react to input pattern No. 1.

If the network of FIG. 8 is now put to sleep, secondary oscillations will occur and stable states will be visited by the resonant firing of neurons. If the internal inhibitory states of the neurons are made long enough, visiting of the same state twice in a row will be discouraged and the network will visit different ones of the states in some pseudo-random sequence. As each state is visited, the resonant firings of the first level neurons representing a learned input pattern, with the second-level neuron which recognizes that input pattern, will tend to further strengthen the connections between such first and second level neurons. In effect, therefore, the normal activity of the inventive network during sleep automatically refreshes the connectivity weights stored in the capacitors in feed-forward connection circuits 30 and in feed-back connection circuits 32. Applicant has observed that the connectivity weights tend to increase in substantially constant proportion to each other, thereby properly maintaining and improving the contrast between the various connectivity values rather than smoothing them all toward an equal level.

Deep Sleep

When the system is awake, neurons fire primarily because of environmental stimulus to the system. When the system is asleep, however' neurons fire primarily because of secondary resonance or oscillation. Although secondary oscillations can occur even while awake, they are in the background, and firings due to them are much less intense than firings due to environmental input, as explained below. Firings due to environmental stimulus are always of a higher intensity than those due to secondary oscillation, so to distinguish between the two types of firings, the first is referred to as High Intensity Firings (HIF), and the second, Low Intensity Firings (LIF). The difference in intensity arises because an environmental input, when active, is normally sustained at a high frequency, and at such sustained frequency the regulator circuits 106 in both first and second level neurons are too slow to quickly dampen the neuronal response. On the other hand, firings due to secondary oscillations can be dampened as soon as the avalanche starts, unless the feed-forward connections have grown so large as to overcome the dampening effect of the regulator circuit. It is therefore readily appreciated that HIF activity is prevalent among neurons when the network is awake, and when the network sleeps, HIF is rare and LIF dominates.

It is preferable that all the learned states in a network be visited with equal probability while the network sleeps, in order to ensure accurate refreshing of the entire connectivity memory terrain. It is possible, however, for connections to increase their affectively to such levels that too much positive feedback between first and second level neurons results and HIF activity occurs even in the absence of environmental input. This phenomenon is referred to herein as deep sleep.

When awake, a network according to the invention exercises some connections with HIF activity more often than others. Some neurons may fire most of the time, while others may not fire at all. As a consequence, only connections that connect neurons that do fire get exercised, thereby increasing their connectivities slightly. Also, if the system learns a new category in the course of its wakefulness, new connections may be established. Connections between neurons that do not fire at all decay slowly; and connections exercised by HIF activity grow faster than those exercised by LIF activity.

Therefore, at the onset of sleep, network states that are visited by HIF activity while awake are favored over those that are not visited at all. During sleep, second level neurons that represent favored states fire more often (with LIF) than do unfavored ones, thereby increasing the affectivity of all connections to or from that favored neuron. The affectivity of these connections may increase indefinitely at the expense of the inactive connections. Instead of contrast-enhancing the connectivity field, the system may lose some memory that is never exercised.

In an aspect of the invention, therefore, apparatus is included in the network for automatically detecting and correcting a deep sleep condition. Referring again to FIG. 1, the network further includes a deep sleep neuron (DSN) 50 having inputs coupled via special connections 52-4, 52-5, 52-6 and 52-7 to the outputs of respective second level neurons 18-4, 18-5, 18-6, 18-7. The deep sleep neuron 50 further includes an inhibitory input coupled to receive a signal from the same mode signal source neuron 40 that operates the isolation switches 22 and 24. The output of DSN 50 is coupled through a DSN pulse extender 52 to the OSN extender signal input 236 (FIG. 4) of each of the feedforward synaptic connection circuits 30.

Figure 11:
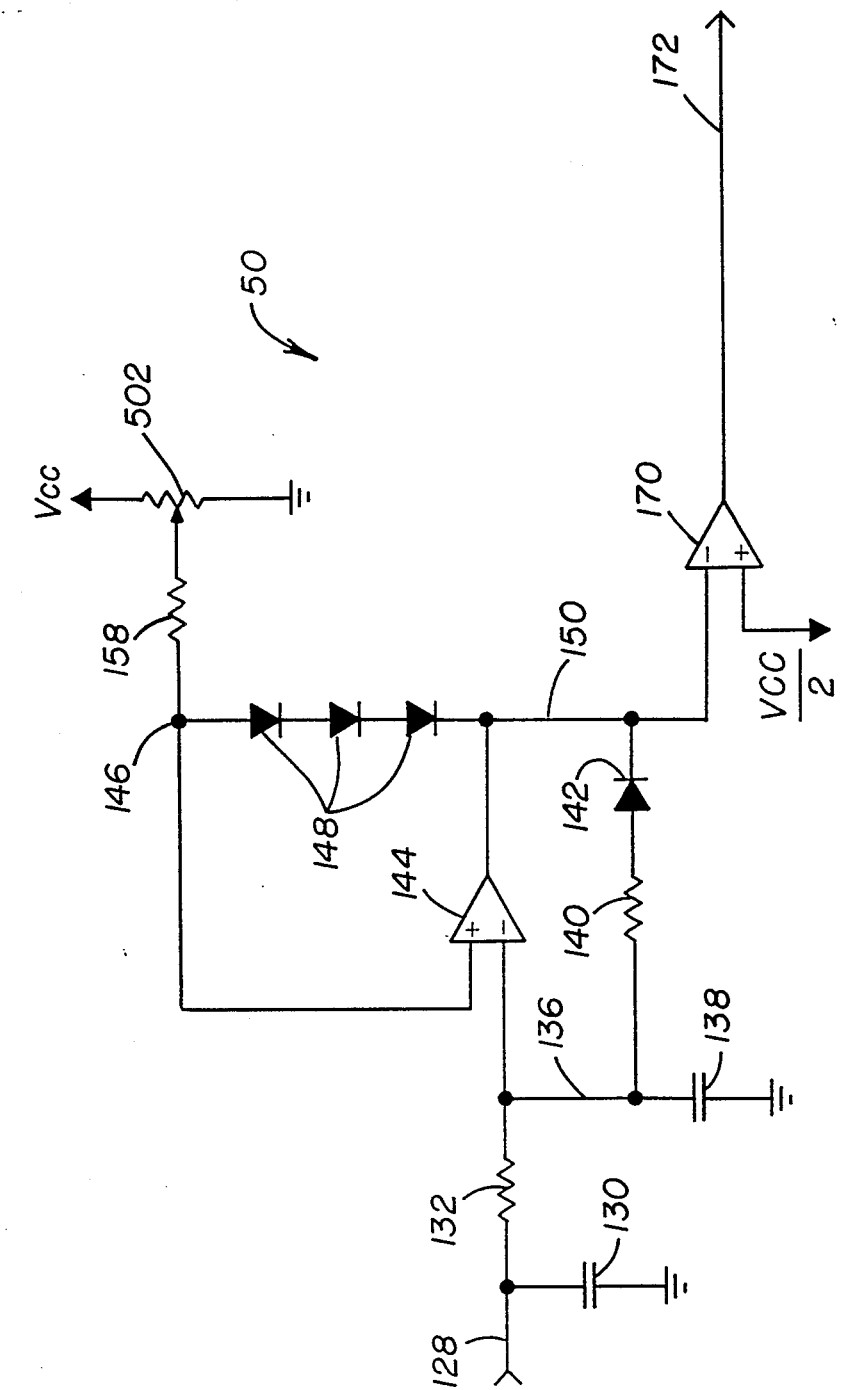
FIG. 11 is a schematic diagram of a deep sleep neuronal circuit.

The DSN 50 is similar in design to that of each of the neurons 16 and 18 shown in FIG. 3, except that the regulator circuit is omitted. A DSN 50 is shown in FIG. 11, and as can be seen, the resistor 158 now couples the threshold circuit node 146 to the tap of a potentiometer 502 connected between Vcc and ground, instead of to the output 164 (FIG. 3) of a regulator circuit. The leakage resistor 134 (FIG. 3) is also omitted from the DSN 50. The activity level output of network mode source neuron 40 provides a strong inhibitory (i.e., negative) signal to the circuit input node 128 of the DSN 50 when the network is awake, and provides little or no signal when the network is asleep. In effect, therefore, network mode source neuron 40 inhibits the operation of DSN 50 when the network is awake.

Figure 9:
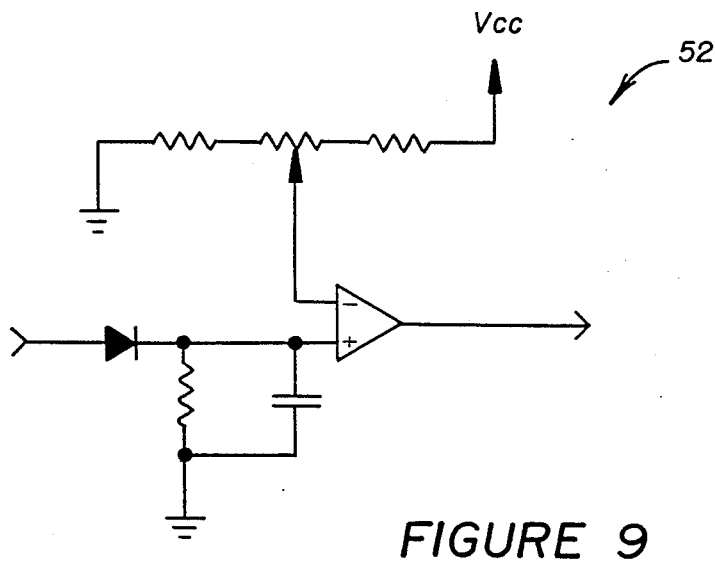
FIG. 9 is a schematic diagram of a deep sleep node pulse extender.

The DSN pulse extender 52 can be implemented as shown in FIG. 9. It is essentially the same as the pulse extender on the learning input of the feed-back synaptic connection circuit shown in FIG. 5. The operation of the pulse extender of FIG. 9 will not be described here in detail, since it has already been described with respect to the synaptic connection circuits. It is noted, however, that instead of being connected to a fixed voltage divider as in the circuit of FIG. 5, the inverting input of the DSN pulse extender 52 is connected to the tap of a potentiometer. This permits experimental adjustment of the length of each pulse in the DSN signal. In an integrated implementation, of course, this potentiometer could be replaced by a fixed pair of resistors.

It is noted further that the function of the DSN pulse extender 52, instead of being performed once at the output of DSN 50, could instead be performed at the deep sleep signal input 236 of each of the feed-forward synaptic connection circuits 30-ij. This, however, would involve an unnecessary duplication of circuitry. The pulse extender at the signal input terminal 206 of each of the feed-forward and feed-back synaptic connection circuits is duplicated in each of these connection circuits only because, at least in the case of the feed-forward synaptic connection circuits 30-ij, the raw pulse information from the first level neuron is needed as well to operate the switches 278 and 280 (FIG. 4). Similarly, in the feed-back synaptic connection circuit 32-ji, the raw pulse information from the second level neuron 18-j is needed to operate the same switches and also the learning switch 220 (FIG. 5). However, it will be appreciated that the circuitry could be modified to provide the pulse extender on the output of each of the neurons, and provide the raw pulse information as an additional output of each of the neurons.

Figure 10:
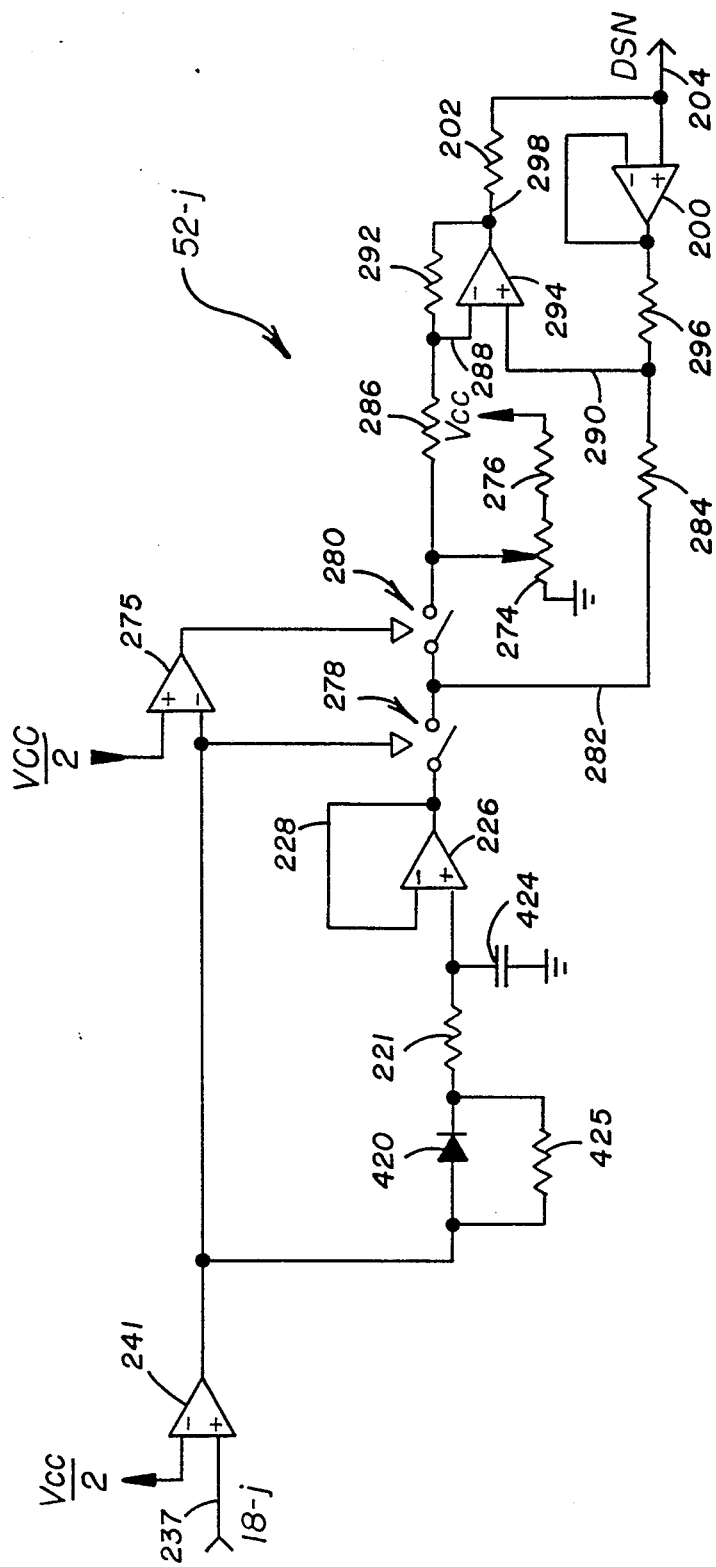
FIG. 10 is a schematic diagram of a special connection for use with a deep sleep neuron.

FIG. 10 shows a schematic diagram of one of the special connection circuits 52-j, coupling the output of one of the second level neurons 18-j to the input of the deep sleep neuron 50. Much of it is identical to the circuitry of either of the synaptic connection circuits 30 or 32, and an explanation of those aspects of the circuit will not be repeated here. In particular, the operation and structural connection between the circuit elements which generate the current pulses on the special connection output terminal 204 at a frequency dictated by the frequency of voltage pulses arriving from the output of second level neuron 18-j, and with a magnitude governed by the voltage on storage capacitor 424, is the same as that of feed-back synaptic connection circuit 32-ji (FIG. 5). The learning mechanism of the special connection 52-j is, however, different than that of feedback synaptic connection circuit 32-ji. Instead of being connected through a switch 220 to the output of a pulse extender (FIG. 5), the terminal of resistor 221 opposite that connected to the storage capacitor 424 is connected to the cathode of a diode 420, the anode of which is connected to the output of impedance converter 241. The diode 420 is also shunted with a resistor 425.

The operation of the deep sleep apparatus will be described with reference to FIGS. 10, 3, 9 and 4 (listed in order of information flow). Initially, at the onset of sleep, it is assumed that the charge level on each of the storage capacitors 424 in the special connections 52 are low. Thus the output terminal 204 of each of special connections 52 carries a series of current pulses at a rate equal to the rate at which voltage pulses are arriving from second level neuron 18-j, but with a very small magnitude because of the small charge in connectivity capacitors 424. These current pulses are all summed at the input terminal 128 of the DSN 50, but because they are so small in magnitude, do not influence the DSN 50 to fire. The output terminal 172 of the DSN 50 therefore carries voltage pulses at the quiescent rate, which, since the DSN 50 has no leakage resistor on its input, is substantially zero. Any pulses output by the DSN 50 are extended by DSN pulse extender 52 and provided to the input terminal 236 of all of the feed-forward synaptic connection circuits 30.

Each of the feed-forward synaptic connection circuits 30-ij continues to operate almost completely as previously described, strengthening its connectivity weight by adding charge on capacitor 124 to the extent of occurrence of high activity levels on both the first level neuron 16-i and the second level neuron 18-j and weakening the connectivity weight by reducing the charge stored on connectivity capacitor 124 to the extent of concurrence of a high activity level on the second level neuron 8-j and a low activity on the first level neuron 6-i. At whatever the present frequency of the DSN 50, a pulse will arrive on input terminal 236 to the feed-forward synaptic connection circuit 30-ij, and during the high voltage portion of the pulse, as previously explained, a low, voltage will be forced at the output 219 of the comparator 217. Should such a pulse arrive at the same time that a pulse arrives on terminal 237 from the second level neuron 18-j, switch 220 will close briefly and connectivity capacitor 124 will be slightly discharged through resistor 221. Since the pulses arriving from second level neuron 18-$j$ are not extended, however, as long as the deep sleep signal remains at a low frequency the discharge of capacitor 124 will be negligible.

If the second level neuron 18-$j$ to which the special connection 52-$j$ is connected never fires, the special connection 52-$j$ will never influence the DSN 50 to fire. The quiescent pulses coming in on terminal 237 of special connection 52-$j$ charge the capacitor 424 in that circuit slightly, but the lengthy low voltage levels of the signal arriving from second level neuron 18-$j$ permit the capacitor to discharge again through resistor 425. Should the second level neuron 18-$j$ fire, the connectivity of special connection 15-$j$ will increase somewhat. It will then decrease again, however, if the second level neuron 18-$j$ then quiets down. It can be seen that if the second level neuron 18-$j$ fires with too high a frequency (HIF), or fires too frequently, the connectivity capacitor 124 in the special connection 52-$j$ will charge up. This will send extended higher level current pulses to the input summing terminal of the DSN 50 and will soon cause the DSN 50 to fire. When it does, pulses will arrive at the terminal 236 of each of the feed-forward synaptic connection circuits 30 at a high rate, thereby causing the discharge of connectivity capacitor 124 in the feed-forward synaptic connection circuits in correspondence with the rate at which pulses are arriving from the post-synaptic second level neuron 18 to which it is connected. In effect, therefore, instead of strengthening the connectivity weight $w_{ij}$, activation of the deep sleep neuron 50 causes a weakening of the connectivity weight $w_{ij}$ in correspondence with the activity level of the second level neuron 18-$j$. The sense of learning has temporarily been reversed.

As the connectivity weight $w_{ij}$ weakens. the frequency at which, and the intensity with which, the second level neuron 18-$j$ fires, will drop. As it does, the connectivity weight in the special connection 52-$j$ will also drop, and the DSN 50 will return to its quiescent output frequency. This returns the feedforward synaptic connection circuits 30 to their normal sense of learning.

In the above description a single DEN 50 controls all the second level neurons 18 in the cluster. If a single one of the second level neurons becomes favored, the sense of learning will be reversed in all of the feed-forward synaptic connections feeding all of the second level neurons in the cluster. This is not a problem, however, since not all of these connections are actually discharged. Charging or discharging of a connectivity capacitor occurs only when the corresponding second level neuron fires, and in deep sleep it is natural that only the favored second level neurons continue to fire. Only the favored connections, therefore, are actually weakened. It will be appreciated that instead of providing one DSN for an entire cluster of second level neurons, each of the second level neurons 18-$j$ may have associated with it its own DSN that controls only the feed-forward synaptic connections associated with the neuron 18-$j$. Note also that feed-back synaptic connections are allowed to strengthen to their maximum levels even during deep sleep. Note further that a simpler deep sleep mechanism may be used instead of that described above. For example, a single all-or-nothing connection may be provided from the output of each second level node 18-$j$ to a "reverse learning sense input of all of the feed-forward synaptic connection circuits abutting neuron 18-$j$.

Deep Sleep Naturally Encourages Weber Law Compliance

The Weber Law rule can be described as follows. Consider two distinct system states, S1 and S2, each represented by a second level neuron. These two states are such that the set of first level neurons that triggers one state (S1) is a subset of the set that triggers the other state (S2). In other words, all first level neurons in the set that triggers S1 are also in the set that triggers S2, but some first level neurons in the set that triggers S2 are not in the set that triggers S1. The Weber Law Rule states that the feed-forward connections for S1 should be stronger than those for S2.

The deep sleep mechanism regulates the feed-forward connections such that this rule is followed. In general, the deep sleep mechanism regulates the feed-forward connections such that connections for more complicated system states (i.e., those states involving activation of a larger number of first level neurons) are weaker than those for less complicated system states.

To show this, assume that all feed-forward connections are initially equal in strength. This means that second level neurons that represent more complicated patterns will receive more current at their summing points than those second level neurons that represent less complicated states. It follows that the more complicated states will be visited more often than less complicated ones, and that eventually the process of connectivity strength reduction through deep sleep will reduce the probability of the more complicated states by reducing the strength of the feed-forward connections which feed the second level neurons representing the more complicated states. Thus the deep sleep mechanism of the inventive network naturally encourages compliance with the Weber Law Rule without requiring additional mechanisms.

The invention has been described with respect to particular embodiments thereof, and it will be understood that numerous modifications are possible without departing from the scope of the invention. For example, though only two levels of neurons are included in the above-described embodiment, it will be understood that these two levels could actually be only a small part of a multi-level network. As another example, though the two levels described are recursive with each other, it will be understood that a network according to the invention can be designed in which three or more neurons are part of each' loop. For example, a first level neuron might be coupled to second level neurons via feed-forward connections, a second level neuron might be coupled to third level neurons via feed-forward connections, and a third level neuron might be coupled to first level neurons via feed-back connections. Other levels may also be included for pre- and post-processing purposes. All these and other variations are intended to be within the scope of the claims.

I claim:

1. A neural network for use with a learning algorithm, a sleep refresh algorithm, and a plurality of environmental input signals, each of said environmental input signals having an activity level, comprising:
   a plurality of N neuronal outputs, each carrying a signal having an activity level, said plurality including M first level neuronal outputs and N−M second level neuronal outputs;

feed-forward response means for generating on a j'th one of said second level neuronal outputs, $M<j\leq N$, a j'th signal having an activity level responsive to the temporal and spatial sum of the activity levels of said signals on all i'th ones of said first level neuronal outputs, $i=1,\ldots,M$, each as weighted by a respective connectivity weight $w_{ij}$;

means for modifying at least one of said connectivity weights $w_{ij}$ in accordance with said learning algorithm; and sleep activated means for, during a sleep period, isolating said neuronal outputs from said environmental inputs and adjusting at least some of said connectivity weights $w_{ij}$ according to said sleep refreshed algorithm.

2. A neutron circuit suitable for use in a neural network comprising:
- a summing junction, a constant voltage node and a summing capacitor coupled between said summing junction and said constant voltage- node;
- an inverting integration having an input and a voltage output;
- an oscillator capacitor; and
- an oscillator circuit having an output coupled to said input of said inverting integrator, and further having means for transferring charge from said summing capacitor to said oscillator capacitor when the voltage across said oscillator capacitor is less than said voltage output of said inverting integrator, and for discharging said oscillator capacitor when the voltage across said oscillator capacitor exceeds said voltage output of said inverting integrator.

3. A neural network for use with input stimuli, comprising:
- a plurality of neuronal circuits, each of said neuronal circuits having an output responsive according to a respective connectivity value to the output of at least on other one of said neuronal circuits;
- learning means for altering said connectivity values in response to said input stimuli according to a learning algorithm; and
- refresh means for altering said connectivity values independently of said input stimuli according to a refresh algorithm.

4. A neural network according to claim 3, further comprising mode select means for selecting between a sleep mode and a waking mode, for enabling said learning means during said waking mode and disabling said learning means during said sleep mode, and for enabling said refresh means during said sleep mode and disabling said refresh means during said waking mode.

5. A neural network according to claim 3, wherein said plurality of neuronal circuits includes M first neuronal circuits and N-M second meuronal circuits, th- output of each of said first and second neuronal circuits carrying a signal having an activity level, the activity level of the output of each j'th one of said second neuronal circuits being responsive according to one of said respective connectivity values $w_{ij}$ to the activity level of the output of each i'th one of said first neuronal circuits, the activity level of the output of each i'th one of said first neuronal circuits being responsive according to one of said respective connectivity values $w_{ji}$ to the activity level of the output of each j'th one of said second neuronal circuits, said neural network further comprising first means for stimulating the activity levels on th- outputs of said first neuronal circuits toward higher activity levels in response to high activity levels on respective ones of said input stimuli, and wherein said learning means comprises first memory adjustment means of' increasing at least one of the connectivity values $w_{ij}$ and $w_{ji}$ in response to simultaneously high activity levels on the output of the i'th first neutronal circuit and on the output of the j'th second neuronal circuit, and for decreasing said at least one of the connectivity values $w_{ij}$ and $w_{ji}$ in response to a simultaneous high activity level on the output of the j'th second neuronal circuit and low activity level on the output of the i'th first neuronal circuit.

6. A neural network according to claim 5, wherein said refresh means comprises:
- said first memory adjustment means;
- means, active during a sleep mode, disabling said first means for stimulating; and
- means, active during said sleep mode, for inducing high activity levels on the outputs of said first neuronal circuits in a pseudorandom sequence.

7. A neuronal network according to claim 6, wherein said means for inducing comprises second means for stimulating the activity levels on the outputs of all of said first neuronal circuits equally toward higher activity levels.

8. A neuronal network according to claim 6' wherein said means for inducing comprises second means for stimulating the activity levels of the outputs of all of said second neuronal circuits equally toward higher activity levels.

9. A neural network according to claim 6, wherein said pseudorandom sequence is such as to tend said connectivity values toward values for which high activity levels appear with equal probability on all committed ones of said second neuronal circuits.

10. A neuronal network according to claim 6, further comprising:
- second memory adjustment means for decreasing the connectivity value $w_{ij}$ in response to simultaneously high activity levels on the output of the i'th first neuronal circuit and on the output of the j'th second neuronal circuit;
- favored neuron detection means, active during said sleep mode, for detecting a favored one of said second neuronal circuits; and
- means, responsive to said favored neuron detection means, for disabling said first memory adjustment means and enabling said second memory adjustment means.

11. A neural network according to claim 10,
wherein said first memory adjustment means increases both of said connectivity values $w_{ij}$ and $w_{ji}$ in response to simultaneously high activity levels on the output of the i'th first neuronal circuit and on the output of the j'th second neuronal circuit, and decreases both said connectivity values $w_{ij}$ and $w_{ji}$ in response a simultaneously high activity level on the output of the j'th second neuronal circuit and low, activity level on the output of the i'th first neuronal circuit;

and wherein said second memory adjustment means further increases said commectivity value $w_{ji}$ in response to the simultaneously high activity levels on the output of the i'th first neuronal circuit and on the output of the j'th second neuronal circuit.

12. A neural network for use with a learning algorithm, a sleep refresh algorithm, and a plurality of environmental input signals, each of said environmental input signals having an activity level, comprising:

a plurality of N neuronal outputs, each carrying a signal having an activity level, said plurality including N first level neuronal outputs and $N-M$ second level neuronal outputs;

feed-forward response means for generating on a j'th one of said second level neuronal outputs, $M<j\leq N$, a j'th signal having an activity level responsive to a temporal and spatial sum of the activity levels of said signals on all i'th ones of said first level neuronal outputs, $i=1,\ldots,M$, each as weighed by a respective connectivity weight $w_{ij}$;

means for modifying at least one of said connectivity weights $w_{ij}$ in accordance with said learning algorithm; and sleep activated means for, during a sleep period, isolating said neuronal outputs from said environmental inputs and adjusting at least some of said connectivity weights $w_{ij}$ according to said sleep refresh algorithm.

13. A neural network according to claim 12, wherein said feed-forward response means generates said j'th signal such that the activity level of said j'th signal is positively responsive to a time integration of the sum of the activity levels of said signals on all i'th ones of said first level neuronal outputs as weighted by said respective connectivity weights $w_{ij}$.

14. A neural network according to claim 12, wherein said feed-forward response means generates said j'th signal such that the activity level of said j'th signal is negatively responsive to a time integration of the activity level of said j'th signal.

15. A neural network according to claim 13, wherein said feed-forward response means generates said j'th signal such that the activity level of said j'th signal is further negatively responsive to a time integration of the activity level of said j'th signal.

16. A neural network according to claim 12, wherein said means for modifying at least one of said connectivity weights $w_{ij}$ includes means for weakening said at least one of said connectivity weights $w_{ij}$ in response to the presence of some predetermined system condition.

17. A neural network according to claim 16, wherein said predetermined system condition is the concurrence of a low activity level on the signal on the i'th first level neuronal output with a high activity level on said signal on said j'th second level neuronal output.

18. A neural network according to claim 12, further comprising means for storing each of said connectivity weights $w_{ij}$ imperfectly, such that each of said connectivity weights $w_{ij}$ decays over time.

19. A neural network according to claim 12, further comprising:

a plurality of F third level neuronal outputs, each carrying a signal having an activity level; and second-to-third level feed-forward response means for generating on a k'th one of said third level neuronal outputs a k'th signal having an activity level responsive to the temporal and spatial sum of the activity levels of said signals on all j'th ones of said second levels neuronal outputs, each as weighted by a respective connectivity weight $w_{jk}$, $j=M+1,\ldots,N$ and $N<k\leq N+P$.

20. A neural network according to claim 12, wherein the activity level of said j'th signal is further responsive to the temporal and spatial sum of the activity levels of said signals on all other k,th ones of said second level neuronal outputs, each as weighted by a respective connectivity weight $w_{kj}$, $k=M+1,\ldots,N$, $k\neq j$, the responsiveness of the activity level of said j'th signal to the activity levels of said second level neuronal outputs having a sense opposite that of said j'th signal to the activity levels of said first level neuronal outputs.

21. A neural network according to claim 20, wherein said activity level of said j'th signal is positively responsive to the activity levels of said first level neuronal outputs and negatively responsive to the activity levels of said second level neuronal outputs.

22. A neural network according to claim 20, wherein said connectivity weights $w_{kj}$, $k=M+1,\ldots,N$, $k\neq j$, are all equal and substantially constant with time.

23. A neural network according to claim 12, wherein said feed-forward response means comprises:

a plurality of M synaptic circuit means, each having an output, each i'th one of said synaptic circuit means $i=1,\ldots,M$, being for generating on said output of said i'th synaptic circuit means a signal having an activity level substantially equal to $w_{ij}$ times the activity level of the signal on a respective i'th one of said first level euronal outputs; and neuronal circuit means for generating on said j'th one of said second level neuronal outputs a signal having an activity level responsive to the temporal and spatial sum of the activity levels of said signals on said outputs of all of said synaptic circuit means.

24. A neural network according to claim 12, wherein said signals on each of said neuronal outputs have a respective frequency, and wherein the activity level of said signal on each given one of said neuronal outputs is represented by the frequency of said given one of said signals, a higher frequency corresponding to a higher activity level and a lower frequency corresponding to a lower activity level.

25. A neural network according to claim 23, wherein said signals on each of said neuronal outputs and on said outputs of each of said synaptic circuit means have a respective frequency, and wherein the activity level of said signal on each given one of said neuronal outputs and on said output of each given one of said synaptic circuit means is represented by the frequency of said given one of said signals, a high frequency corresponding to a higher activity level and a lower frequency corresponding to a lower activity level.

26. A neural network according to claim 25, wherein said signals on each of said neuronal outputs are represented by respective voltage waveforms and said signals on said outputs of each of said synaptic circuit means are represented by respective current waveforms.

27. A neural network according to claim 12, further comprising means for inducing said sleep period periodically.

28. A neural network according to claim 12, further comprising:

feed-back response means for generating on an i'th one of said first level neuronal outputs, $1\leq i\leq M$, an i'th signal having an activity level responsive to the temporal and spatial sum of the activity levels of said signals on all j'th ones cf said second level neuronal outputs, $j=M+1,\ldots,N$, each as weighted by a respective connectivity weight $w_{ji}$, and of the activity level of at least one of said environmental input signals; and means for modifying at least one of said connectivity weights $w_{ji}$, $M<j\leq N$, in accordance with said learning algorithm, wherein said sleep activated means is further for adjusting at least one of said connectivity weights $w_{ji}$, $j=M+1,\ldots,N$ during said sleep period.

29. A neural network according to claim 19, further comprising third-to,-first level feed-back response means for generating, on an i th one of said first level neuronal outputs, $1\leq i\leq M$, an i'th signal having an activity level responsive to the temporal and spatial sum of the activity levels of said signals on all k'th ones of said third level neuronal outputs, $k=N+1,\ldots,N+P$, each as weighted by a respective connectivity weight $w_{ki}$, and of the activity level of at least one of said environmental inputs signals; and means for modifying at least one of said connection weights $w_{ki}$, $N<k\leq N+P$, in accordance with said learning algorithm, wherein said sleep activated means is further for adjusting said connectivity weights $w_{ki}$, $k=N+1,\ldots,N+P$, during said sleep period.

30. A network according to claim 28, wherein said feed-forward response means generates said j'th signal such that the activity level of said j'th signal is positively responsive to a time integration of the sum of the activity levels of said signals on all i'th ones of said first level neuronal outputs as weighted by said respective connectivity weights $w_{ij}$, is further negatively responsive, according to substantially constant respective inhibitory connectivity weights, to a time integration of the sum of the activity levels on all other ones of said second level neuronal outputs, and is further negatively responsive to a time integration of the activity level of said j'th signal;

wherein said feed-back response means generates said i'th signal such that the activity level of said i'th signal is positively responsive to a time integration of the sum of the activity levels of said signals on all j'th ones of said second level neuronal outputs as weighted by said respective connectivity weights $w_{ji}$, plus a time integration of the activity level of an i'th one of said environmental input signals, and is further negatively responsive to a time integration of the activity level of said i'th signal;

and wherein said sleep activated means is further for adjusting at least some of said connectivity weights $w_{ji}$, during said sleep period.

31. A network according to claim 30, further comprising a sleep neuronal output carrying a sleep signal having an activity level, wherein said feed-forward response means generates said j'th signal such that the activity level of said j'th signal is further positively responsive to the activity level of said sleep signal.

32. A network according to claim 31, wherein said sleep activated means is further for increasing the activity level of said sleep signal during said sleep period and decreasing the activity level of said sleep signal outside of said sleep period.

33. A network according to claim 30, further comprising a sleep neuronal output carrying a sleep signal having an activity level, wherein said feed-back response means generates said i'th signal such that the activity level of said i'th signal is further positively responsive to the activity level of said sleep signal.

34. A network according to claim 30, wherein said sleep activated means is further for generating secondary resonances during said sleep period, in which the activity levels of different ones of said second level output signals rise and fall according to a pseudorandom sequence, and wherein said sleep refresh algorithm revises said pseudorandom sequence such that the activity levels of all committee ones of said second level output signals rise and fall with greater equi-probability.

35. A network according to claim 30, wherein said learning algorithm includes increasing each of said connectivity weights $w_{ij}$ by an amount commensurate with any concurrence of a high activity level of both the i'th and j'th neuronal output signals, and decreasing each of said connectivity weight $w_{ij}$ by an amount commensurate with any concurrence of a low activity level on said i'th neuronal output signal and a high activity level on said j'th neuronal output signal.

36. A network according to claim 35, wherein said sleep activated means is further for generating secondary resonances during said sleep period, in which the activity levels of different ones of said second level output signals rise and fall according to a pseudorandom sequence, and wherein said sleep refresh algorithm revises said pseudorandom sequence such that the activity levels o& all committed ones of said second level output signals rise and fall with greater equi-probability.

37. A network according to claim 35, wherein said sleep activated means is further for generating secondary resonances during said sleep period, in which the activity levels of different ones of said second level neuronal output signals rise and fall according to a pseudorandom sequence, and wherein said refresh algorithm includes strengthening at least some of said connectivity weights and weakening, in response to undesirably frequent secondary resonances involving a particular j'th neuronal output, each of said connectivity weights $w_{iJ}$ by an amount commensurate with any concurrence of a high activity level on both said i'th and J'th neuronal output signals.

38. A neural network for use with a plurality of environmental input signals each having an activity level, comprising:

a plurality of first level neuronal circuits each having at least one input. each of said inputs of each of said first level neuronal circuits carrying an input signal having an activity level, each of said first level neuronal circuits further having an output and means for providing on said output of said first level neuronal circuit an output signal having an activity level at least partially responsive to a time integration of the sum of the activity levels of said input signals of said first level neuronal circuit;

a group of second level neuronal circuits each having at least one input, each at said inputs of each of said second level neuronal circuits carrying an input signal having an activity level, each of said second level neuronal circuits further having an output and means for providing on said output of said second level neuronal circuit an output signal having an activity level at least partially responsive to a time integration of the sum of the activity levels of said input signals of said second level neuronal circuit and at least partially counter-responsive to a time integration of the sum of the activity levels of the output signals of all other ones of said second level neuronal circuits in said group.

a plurality of feed forward connection circuits each having an input carrying an input signal having an activity level, storage means for storing a respective connectivity strength, an output and means for providing on said output of said feed-forward connection circuit an output signal having an activity level responsive to the activity level of said input signal of said feed-forward connection circuit as weighted by said respective connectivity strength, said input of each of said feed-forward connection circuits being coupled to receive the output signal of a respective one of said first level neuronal circuits and said output of each of said feed-forward connection circuits being coupled to provide said output signal of said feed-forward connection circuit to one of said inputs of a respective one of said second level neuronal circuits in said group, the output of each of said first level neuronal circuits being coupled to an input of all of said second level neuronal circuits in said group via respective ones of said feed-forward connection circuits;

a plurality of feed-back connection circuits each having an input carrying an input signal having an activity level, storage means for storing a respective connectivity strength, an output and means for providing on said output of said feed-back connection circuit an output signal having an activity level responsive to the activity level of said input signal of said feed-back connection circuit as weighted by said respective connectivity strength of said feed-back connection circuit, said input of each of said feed-back connection circuits being coupled to receive the output signal of a respective one of said second level neuronal circuits and said output of each of said feed-back connection circuit being coupled to provide said output signal of said feed-back connection circuit to one of said inputs of a respective one of said first level neuronal circuits, the output of each of said second level neuronal circuits in said group being coupled to an input of all of said first level neuronal circuits via respective ones of said feed-back connection circuits. said means for providing. in all of said first and second level neuronal circuits and said feed-forward and feed-back connection circuits, being such that the net feedback of activity levels around any loop is non-negative; and learning means for adjusting said connectivity strengths stored in said storage means in said feed-forward and feed-back convection circuits in accordance with a learning algorithm.

39. A network according to claim 38, wherein one of said inputs to one of said first level neuronal circuits is coupled to receive a respective one of said environmental input signals.

40. A network according to claim 38, wherein said means, in each gives one of said second level neuronal circuits in said group, for providing an output signal having an activity level at least partially counter-responsive to a time integration of the sum of the activity levels of the output signals of all other ones of said second level neuronal circuits in said group comprises a plurality of inhibitory connection circuits each having an input carrying an input signal having an activity level, an output and means for providing on said output of said inhibitory connection circuit an output signal having an activity level counter-responsive to the activity level of said input signal of said inhibitory connection circuit, said outputs of all of said inhibitory connection circuits being coupled to respective inputs of said given one of said second level neuronal circuit and said input of each of said inhibitory connection circuits being coupled to receive said output signal of a respective one of said other second level neuronal circuits, the output of each of said second level neuronal circuits in said group being coupled to an input of all other ones of said second level neuronal circuits in said group via respective ones of said inhibitory connection circuits.

41. A network according to claim 38, wherein said means for providing, in each given one of said first and second level neuronal circuits, is further such that the time rate of change of the activity level of said output signal of said given one of said neuronal circuits is counter-responsive to the instantaneous activity level of said output signal of said given one of said neuronal circuits so as to dampen resonances due to said net non-negative feedback of activity levels around any loop which includes said given one of said neuronal circuits.

42. A network according to claim 41,
wherein said means for providing, in each given one of said first level neuronal circuits, is such that the activity level of said output signal of said given one of said first level neuronal circuits has a respective positive quiescent value when the sum of said activity levels of said inputs of said given one of said first level neuronal circuits is constant with time.

43. A network according to claim 40,
wherein said means for providing, in each given one of said first and second level neuronal circuits, is further such that the time rate of change of the activity level of said output signal of said given one of said neuronal circuits is counterresponsive to the instantaneous activity level of said output signal of said given one of said neuronal circuits so as to dampen resonances due to said net non-negative feedback of activity levels around any loop which includes said given one of said neuronal circuits,
wherein said means for providing, in each given one of said first bevel neuronal circuits, is such that the activity level of said output signal of said given one of said first level neuronal circuits has a respective positive quiescent value when the sum of said activity levels of said inputs of said given one of said first level neuronal circuits is constant with time,
and wherein said means for providing, in each given one of said second level neuronal circuits, is such that the activity level of said output signal of said given one of said second level neuronal circuits has a respective positive quiescent value when the sum of the activity levels of said input signals of said given one of said second level neuronal circuits, minus a weighted sum of the activity levels of the output signals of said all other ones of said second level neuronal circuits, is constant with time.

44. A network according to claim 38, wherein said learning means comprises:
means for increasing the connectivity strength stored in the storage means of each given one of said feed-forward connection circuits by an amount commensurate with any concurrence of a high activity level on the input signal of said given feed-forward connection circuit and a high activity level on the output signal of the second level neuronal circuit to which the output of said given feed-forward connection circuit is coupled, and for decreasing said connectivity strength stored in said storage means of said given feed-forward connection circuit by an amount commensurate with any concurrence of a low activity level on said input signal of said given feed-forward connection circuit and a high activity level on the output signal of the second level neuronal circuit to which the output of said given feed-forward connection circuit is coupled; and means for increasing the connectivity strength stored in the storage means of each given one of said feed-back connection circuits by an amount commensurate with any concurrence of a high activity level on the input signal of said given feed-back connection circuit and a high activity level on the output signal of the first level neuronal circuit to which the output of said given feed-back connection circuit is coupled, and for decreasing said connectivity strength stored in said storage means of said given feed-back connection circuit by an amount commensurate with any concurrence of a high activity level on said input signal of said feed-forward connection circuit and a low activity level on the output signal of the first level neuronal circuit to which the output of said given feed-back connection circuit is coupled.

45. A network according to claim 38, operable selectably in an awake mode or in a sleep mode, wherein one of the inputs to each of said first level neuronal circuits is coupled to receive a respective one of said environmental input signals, wherein said means for providing, in each given one of said first level neuronal circuits, is further such that the activity level of said output signal of said given one of said first level neuronal circuits is positively responsive to a time integration of the sum of all of the activity levels of the input signals of said given first level neuronal circuit, and is further such that the time rate of change of the activity level of said output signal of said given one of said first level neuronal circuits is negatively responsive to th- instantaneous value of said activity level of said output signal of said given one of said first level neuronal circuits, wherein said means for providing, in each given one of said second level neuronal circuits, is further such that the activity level of said output signal of said given one of said second level neuronal circuits is positively responsive to a time integration of the sum of all of the activity levels of said input signals of said second level neuronal circuits is further such that the activity level of said output signal of said given one of said second level neuronal circuits is negatively responsive to a time integration of a weighted sum of the activity levels of said output signals of all other ones of said second level neuronal circuits, and is further such that the time rate of change of the activity level of said output signal of said given one of said second level neuronal circuits is negatively responsive to the instantaneous value of the activity level of said output signal of said given one of said second level neuronal circuits, and wherein said learning means comprises:

means for increasing the connectivity strength stored in the stprage means of each given one of said feed-forward connection circuits by an amount commensurate with any concurrence of a high activity level on the input signal of said given feed-forward connection circuit and a high activity level on the output signal of the second level neuronal circuit to which the output of said given feed-forward connection circuit is coupled, and for decreasing said connectivity strength stored in said storage means of said given feed-forward connection circuit by an amount commensurate with any concurrence of a low activity level on said input signal of said given feed-forward connection circuit and a high activity level on the output signal of the second level neuronal circuit to which the output of said given feed-forward connection circuit is coupled; and means for increasing the connectivity strength stored in the storage means of each given one of said feed-back connection circuits by an amount commensurate with any concurrence of a high activity level on the input signal of said given feed-back connection circuit and a high activity level on the output signal of the first level neuronal circuit to which the output of said given feed-back connection circuit is coupled, and for decreasing said connectivity strength stored in said storage means of said given feed-back connection circuit by an amount commensurate with any concurrence of a high activity level on said input signal of said feed-forward connection circuit and a low activity level on the output signal of the first level neuronal circuit to which the output of said given feed-back connection circuit is coupled.

said network further comprising background signal source means for, at least when said network is in said sleep mode, applying a substantially constant background signal to an input of all of said second level neuronal circuits.

46. A network according to claim 45, further comprising means for decoupling all of said input signals from said first level neuronal circuits while said network is operated in said sleep mode.

47. A network according to claim 46, further comprising:

first means operative during sleep for detecting a favored state condition in which the signals on the outputs of certain ones of said second level neuronal circuits reach an activity level disparately more often relative to the signal on the outputs of the others of said second level neuronal circuits; and second means operative during sleep for reversing the sense by which said learning means adjusts the connectivity strengths stored in the storage means of each of said feed-forward connection circuits which abut any of said certain second level neuronal circuits.

48. A network according to claim 47, wherein said second means operates to reverse the sense by which said learning means adjusts the connectivity strengths stored in the storage means of all of said feed-forward connection circuits when said first means detects said favored state condition.

49. A network according to claim 38, operable selectably in an awake mode or in a sleep mode, wherein one of the inputs to each of said first level neuronal circuits is coupled to receive a respective one of said environmental input signals, wherein said means for providing in each given one of said first level neuronal circuits, is further such that the activity level of said output signal of said given one of said first level neuronal circuits is positively responsive to a time integration of the sum of all of the activity levels of the input signals of said given first level neuronal circuit, and is further such that the time rate of change of the activity level of said output signal of said given one of said first level neuronal circuits is negatively responsive to the instantaneous value of said activity level of said output signal of said given one of said first level neuronal circuits, wherein said means for providing, in each given one of said second level neuronal circuits, is further such that the activity level of said output signal of said given one of said second level neuronal circuit is positively responsive to a time integration of the sum of all of the activity levels of said input signals of said second level neuronal circuits, is further such that the activity level of said output signal of said given one of said second level neuronal circuits is negatively responsive to a time integration of a weighted sum of the activity levels of said output signals of all other ones of said second level neuronal circuits, and is further such that the time rate of change of the activity level of said output signal of said given one of said second level neuronal circuits is negatively responsive to the instantaneous value of the activity level of said output signal of said given one of said second level neuronal circuits, and wherein said learning means comprises:

means for increasing the connectivity strength stored in the storage means of each given one of said feed-forward connection circuits by an amount commensurate with any concurrence of a high activity level on the input signal of said given feed-forward connection circuit and a high activity level on the output signal of the second level neuronal circuit to which the output of said given feed-forward connection circuit is coupled, and for decreasing said connectivity strength stored in said storage means of said given feed-forward connection circuit by an amount commensurate with any concurrence of a low activity level on said input signal of said given feed-forward connection circuit and a high activity level on the output signal of the second level neuronal circuit to which the output of said given feed-forward connection circuit is coupled; and means for increasing the connectivity strength stored in the storage means of each given one of said feed-back connection circuits by an amount commensurate with any concurrence of a high activity level on the input signal of said given feed-back connection circuit and a high activity level on the output signal of the first level neuronal circuit to which the output of said given feed-back connection circuit is coupled, and for decreasing said connectivity strength stored in said storage means of said given feed-back connection circuit by an amount commensurate with any concurrence of a high activity level on said input signal of said feed-forward connection circuit and a low activity level on the output signal of the first level neuronal circuit to which the output of said given feed-back connection circuit is coupled, said network further comprising background signal source means for, at least when said network is in said sleep mode, applying a substantially constant background signal to an input of all of said first level neuronal circuits.

50. A neuron circuit suitable for use in a neural network, Comprising:

a plurality of current input lines;
an output line; and
means for providing on said output line an output signal having a frequency positively responsive to a time integration of the sum of currents of said current input lines and negatively responsive to a time integration of said output signal.

51. A circuit according to claim 50 wherein said means for providing comprises:

a summing junction, coupled to receive all of said current inputs;
a constant voltage node;
a summing capacitor coupled between said summing junction and said constant voltage node;
regulator means having an input and an output, for providing of said output of said regulator means a voltage signal positively responsive to the frequency of the signal on said input of said regulator means; and
oscillator means having first and second inputs and an output, said first input of said oscillator means being coupled to said summing junction, said second input of said oscillator means being coupled to receive said output of said regulator means, and said input of said regulator means being coupled to receive said output of said oscillator means, said oscillator means being for providing on said output of said oscillator means a signal having a frequency positively responsive to the difference between the voltages on said first and second inputs of said oscillator means.

52. A synaptic connection circuit suitable for use in a neural network, comprising:

a pre-synaptic signal input and a current output;
a storage capacitor; and
means for providing on said output of said synaptic connection circuit a current signal the time average of which is positively responsive to the voltage across said storage capacitor times the frequency of the signal on said pre-synaptic signal input.

53. A circuit according to claim 52, wherein said means for providing comprises means for providing on said output of said synaptic connection circuit a current pulse signal having a frequency equal to the frequency of the signal on said pre-synaptic signal input and having a magnitude positively responsive to the voltage across said storage capacitor.

54. A circuit according to claim 52, further comprising:

a post-synaptic signal input; and
means for adjusting in a predetermined direction the voltage across said storage capacitor in response to the concurrence of a high frequency on said pre-synaptic signal input and a high frequency on said post synaptic signal input.

55. A circuit according to claim 54, wherein said predetermined direction is the increasing direction.

56. A circuit according to claim 54, further comprising a deep sleep signal input, wherein said means for adjusting comprises means for selecting between the increasing direction and the decreasing direction as said predetermined direction in response to said deep-sleep signal input.

57. A circuit according to claim 54, wherein the signal on said pre- and post-synaptic inputs each consists of a series of pulses at a respective varying frequency, and wherein said means for adjusting comprising means for adjusting the voltage across said storage capacitor in said predetermined direction whenever a pulse on said pre-synaptic input occurs at the same time as a pulse on said post-synaptic input.

58. A circuit according to claim 52, further comprising:
- a post-synaptic signal input;
- deep-sleep means having an input coupled to receive the signal on said post synaptic signal input and further having an output, for providing on said output a pulse signal having a frequency positively responsive to a time integration of the frequency of the signal on said post-synaptic signal input; and
- means for increasing the voltage across said storage capacitor in response to the concurrence of a pulse on said pre-synaptic input, a pulse on said post-synaptic input and an inter-pulse space on said output of said deep-sleep means, and for decreasing the voltage across said storage capacitor in response to the concurrence of a pulse on said pre-synaptic input, a pulse on said post-synaptic input and a pulse on said output of said deep-sleep means.

59. A synaptic connection circuit suitable for use in a neural network, comprising:
- a pre-synaptic signal input and a current output;
- a storage capacitor;
- a transconductance converter having an input and an output, said output of said transconductance converter being said current output of said synaptic connection circuit; and
- switch means for coupling the voltage on said storage capacitor to said input of said transconductance converter on each pulse of said pre-synaptic signal input.

60. A circuit according to claim 59, further comprising:
- a voltage reference node;
- learning switch means for coupling said storage capacitor to said voltage reference node on each pulse on one of said pre- and post-synaptic inputs; and
- means for generating a pulse on said voltage reference node on each pulse on the other of said pre- and post-synaptic inputs.

61. A circuit according to claim 60, wherein said means for generating a pulse on said voltage reference node comprises a pulse extender having an input coupled to receive pulses from said other of said pre- and post-synaptic inputs and having an output coupled to said voltage reference node.

62. A circuit according to claim 60, further comprising a deep-sleep signal input, wherein said means for generating a pulse on said voltage reference node comprises an inverter coupled between said voltage reference node and said other of said pre- and post-synaptic inputs, said inverter being operable on each pulse on said deep-sleep signal input.

* * * * *